(12) United States Patent
Loheide et al.

(10) Patent No.: US 11,197,062 B2
(45) Date of Patent: ***Dec. 7, 2021

(54) DELIVERY OF DIFFERENT SERVICES THROUGH DIFFERENT CLIENT DEVICES

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory Mcclain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, Mcdonough, GA (US)

(73) Assignee: Turner Broadcasting System, Inc., Atlanta, GA (US)

(*) Notice: Subject to any disclaimer, the term of this patent is extended or adjusted under 35 U.S.C. 154(b) by 144 days.

This patent is subject to a terminal disclaimer.

(21) Appl. No.: 15/988,492

(22) Filed: May 24, 2018

(65) Prior Publication Data

US 2018/0343477 A1 Nov. 29, 2018

Related U.S. Application Data

(60) Provisional application No. 62/511,190, filed on May 25, 2017.

(51) Int. Cl.
*H04N 21/458* (2011.01)
*H04N 21/435* (2011.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
CPC . H04N 21/234; H04N 21/2552; H04N 21/235
See application file for complete search history.

(56) References Cited

U.S. PATENT DOCUMENTS

| 3,751,581 | A | 8/1973 | Sakata et al. |
| 4,500,930 | A | 2/1985 | Hamalainen et al. |

(Continued)

OTHER PUBLICATIONS

Advisory Action for U.S. Appl. No. 15/396,614 dated Oct. 24, 2019.
(Continued)

*Primary Examiner* — Mushfikh I Alam
(74) *Attorney, Agent, or Firm* — Chip Law Group

(57) ABSTRACT

A system that handles delivery of service(s) through a client device, includes an interactive service provider, a video service provider, and a client device. The interactive service provider inserts at least one of digital watermarks and digital fingerprints in non-programming media content. The video service provider transmits a media stream of the media content that includes programming media content and the non-programming media content. The client device detects at least one of the inserted digital watermarks and the digital fingerprints in the playback duration of the media content and renders overlay graphics on the media content. The client device activates at least one of input devices paired with the client device and the rendered overlay graphics. The client device further receives trigger responses over activated overlay graphics and displays an interactive view to enable delivery of service(s) in response to the trigger responses.

21 Claims, 16 Drawing Sheets

(51) Int. Cl.

| | |
|---|---|
| *H04L 29/08* | (2006.01) |
| *H04N 21/431* | (2011.01) |
| *H04N 21/81* | (2011.01) |
| *G06Q 30/02* | (2012.01) |
| *H04L 29/06* | (2006.01) |
| *H04N 21/478* | (2011.01) |
| *H04N 21/233* | (2011.01) |
| *H04N 21/234* | (2011.01) |
| *H04N 21/2387* | (2011.01) |
| *H04N 21/2389* | (2011.01) |
| *H04N 21/8545* | (2011.01) |
| *G06Q 30/06* | (2012.01) |
| *H04N 21/2543* | (2011.01) |
| *H04N 21/44* | (2011.01) |
| *H04N 21/845* | (2011.01) |
| *H04N 21/235* | (2011.01) |
| *H04N 21/258* | (2011.01) |
| *H04N 21/6332* | (2011.01) |
| *H04N 21/266* | (2011.01) |
| *H04N 21/84* | (2011.01) |
| *H04N 21/239* | (2011.01) |
| *H04N 21/262* | (2011.01) |
| *H04N 21/2668* | (2011.01) |
| *H04N 21/6587* | (2011.01) |
| *H04L 9/32* | (2006.01) |
| *H04N 21/24* | (2011.01) |
| *H04N 21/472* | (2011.01) |
| *H04N 21/835* | (2011.01) |
| *H04H 20/10* | (2008.01) |
| *H04N 21/8358* | (2011.01) |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(56) References Cited

U.S. PATENT DOCUMENTS

| | | | |
|---|---|---|---|
| 5,294,981 A | 3/1994 | Yazolino et al. | |
| 6,229,524 B1 | 5/2001 | Chernock et al. | |
| 6,378,129 B1 | 4/2002 | Zetts | |
| 6,434,621 B1 | 8/2002 | Pezzillo et al. | |
| 6,625,811 B1 | 9/2003 | Kaneko | |
| 6,701,355 B1 | 3/2004 | Brandt et al. | |
| 6,727,914 B1 | 4/2004 | Gutta | |
| 7,051,352 B1 | 5/2006 | Schaffer | |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gulla | |
| 7,985,134 B2 | 7/2011 | Ellis | |
| 8,005,826 B1 | 8/2011 | Sahami et al. | |
| 8,099,757 B2 | 1/2012 | Riedl et al. | |
| 8,132,203 B2 | 3/2012 | Heer | |
| 8,533,761 B1 | 9/2013 | Sahami et al. | |
| 8,553,853 B2 * | 10/2013 | Middleswarth | H04M 3/382 379/88.01 |
| 8,572,649 B1 | 10/2013 | Gossweiler et al. | |
| 8,578,042 B2 | 11/2013 | Hu et al. | |
| 8,600,382 B2 * | 12/2013 | Hicks, III | H04L 12/2838 455/435.2 |
| 8,631,440 B2 | 1/2014 | Gossweiler et al. | |
| 8,826,443 B1 | 9/2014 | Raman et al. | |
| 8,842,879 B2 | 9/2014 | Laksono et al. | |
| 8,843,965 B1 | 9/2014 | Kurapati et al. | |
| 8,954,521 B1 * | 2/2015 | Faaborg | H04L 51/046 709/206 |
| 9,094,639 B2 | 7/2015 | Yim et al. | |
| 9,130,918 B2 | 9/2015 | Picconi et al. | |
| 9,342,668 B2 | 5/2016 | Wang et al. | |
| 9,380,264 B1 | 6/2016 | Vakalapudi | |
| 9,390,447 B1 | 7/2016 | Smith | |
| 10,075,753 B2 | 9/2018 | Loheide et al. | |
| 2002/0038457 A1 | 3/2002 | Numata et al. | |
| 2002/0178447 A1 | 11/2002 | Plotnick et al. | |
| 2003/0023757 A1 | 1/2003 | Ishioka et al. | |
| 2003/0026628 A1 | 2/2003 | Arimoto | |
| 2003/0051239 A1 | 3/2003 | Hudspeth | |
| 2003/0110507 A1 | 6/2003 | Dimitrova et al. | |
| 2003/0126600 A1 | 7/2003 | Heuvelman | |
| 2003/0151538 A1 * | 8/2003 | Escobosa | H04N 21/42207 341/176 |
| 2003/0182658 A1 | 9/2003 | Alexander | |
| 2003/0212708 A1 | 11/2003 | Potrebic et al. | |
| 2003/0236832 A1 | 12/2003 | McIntyre et al. | |
| 2004/0022278 A1 | 2/2004 | Thomas et al. | |
| 2004/0031056 A1 | 2/2004 | Wolff | |
| 2004/0128682 A1 | 7/2004 | Liga et al. | |
| 2004/0163103 A1 | 8/2004 | Swix et al. | |
| 2004/0172650 A1 | 9/2004 | Hawkins et al. | |
| 2005/0015816 A1 | 1/2005 | Christofalo et al. | |
| 2005/0060745 A1 | 3/2005 | Riedl et al. | |
| 2005/0096978 A1 | 5/2005 | Black | |
| 2005/0120369 A1 | 6/2005 | Matz | |
| 2005/0132401 A1 | 6/2005 | Boccon-Gibod et al. | |
| 2005/0135613 A1 | 6/2005 | Brandenburg et al. | |
| 2006/0031889 A1 | 2/2006 | Bennett et al. | |
| 2006/0064730 A1 | 3/2006 | Rael et al. | |
| 2006/0122916 A1 | 6/2006 | Kassan | |
| 2006/0287915 A1 | 12/2006 | Boulet et al. | |
| 2007/0011718 A1 | 1/2007 | Nee | |
| 2007/0033419 A1 | 2/2007 | Kocher et al. | |
| 2007/0186228 A1 | 8/2007 | Ramaswamy et al. | |
| 2007/0238035 A1 | 10/2007 | Holscher et al. | |
| 2007/0250901 A1 * | 10/2007 | McIntire | H04N 7/17318 725/146 |
| 2008/0086742 A1 | 4/2008 | Aldrey et al. | |
| 2008/0201735 A1 | 8/2008 | Sumiyoshi et al. | |
| 2008/0271078 A1 | 10/2008 | Gossweiler et al. | |
| 2008/0271080 A1 | 10/2008 | Gossweiler et al. | |
| 2008/0320513 A1 | 12/2008 | Wong et al. | |
| 2009/0070808 A1 | 3/2009 | Jacobs | |
| 2009/0070819 A1 | 3/2009 | Gajda et al. | |
| 2009/0100452 A1 | 4/2009 | Hudgeons et al. | |
| 2009/0254934 A1 | 10/2009 | Grammens | |
| 2009/0256972 A1 | 10/2009 | Ramaswamy et al. | |
| 2009/0285217 A1 | 11/2009 | Frink et al. | |
| 2009/0287790 A1 | 11/2009 | Upton et al. | |
| 2010/0010899 A1 | 1/2010 | Lambert et al. | |
| 2010/0125880 A1 | 5/2010 | Roewe | |

(56) References Cited

U.S. PATENT DOCUMENTS

| | | |
|---|---|---|
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1* | 11/2010 | Lefebvre .......... H04N 21/23805 709/231 |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1* | 7/2011 | Gupta .................. H04N 21/858 455/3.06 |
| 2011/0209181 A1* | 8/2011 | Gupta ................ H04N 21/4345 725/62 |
| 2011/0238754 A1 | 9/2011 | Dasilva et al. |
| 2011/0246202 A1* | 10/2011 | McMillan .............. G10L 19/018 704/270 |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1* | 8/2013 | Sinha ................... G06T 1/0021 715/719 |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1* | 10/2013 | Kent .................... H04N 21/458 725/34 |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1* | 6/2014 | Childs ...................... H04N 5/76 348/552 |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0289022 A1* | 10/2015 | Gross .................. H04N 21/482 725/51 |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1* | 5/2016 | Langer ............... H04N 21/4751 725/28 |
| 2016/0127788 A1* | 5/2016 | Roberts .............. H04N 21/4312 725/37 |
| 2016/0150290 A1 | 5/2016 | Chandler et al. |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1* | 9/2016 | Noble ............... H04N 21/42221 725/81 |
| 2016/0308958 A1 | 10/2016 | Navali et al. |
| 2016/0316247 A1 | 10/2016 | Biagini et al. |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099506 A1* | 4/2017 | Grover .................. G06F 16/783 |
| 2017/0099525 A1 | 4/2017 | Ray et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0289597 A1 | 10/2017 | Riedel et al. |
| 2018/0007060 A1* | 1/2018 | Leblang ................ H04L 63/107 |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1 | 10/2018 | Hammitt et al. |
| 2018/0343505 A1 | 11/2018 | Loheide et al. |
| 2020/0244778 A1* | 7/2020 | Beroukhim ............. H04W 8/18 |

OTHER PUBLICATIONS

Corrected Notice of Allowance for U.S. Appl. No. 15/396,624 dated Sep. 5, 2019.

Final Office Action for U.S. Appl. No. 15/396,468 dated Nov. 6, 2019.

Non-Final Office Action for U.S. Appl. No. 15/396,624 dated Oct. 16, 2019.

Non-Final Office Action for U.S. Appl. No. 15/986,218 dated Sep. 27, 2019.

Non-Final Office Action for U.S. Appl. No. 15/986,286 dated Nov. 29, 2019.

Non-Final Office Action for U.S. Appl. No. 15/988,308 dated Dec. 3, 2019.

Non-Final Office Action for U.S. Appl. No. 16/229,310 dated Nov. 29, 2019.

Advisory Action for U.S. Appl. No. 15/396,475 dated Jun. 3, 2019.

Advisory Action for U.S. Appl. No. 15/988,308 dated Jul. 16, 2019.

Advisory Action for U.S. Appl. No. 15/986,218 dated Jul. 12, 2019.

Corrected Notice of Allowance for U.S. Appl. No. 15/396,453 dated Jun. 3, 2019.

Corrected Notice of Allowance for U.S. Appl. No. 15/396,453 dated Aug. 21, 2019.

Corrected Notice of Allowance in U.S. Appl. No. 15/396,453 dated Jun. 13, 2019.

Final Office Action for U.S. Appl. No. 15/396,614 dated Aug. 12, 2019.

Non-Final Office Action for U.S. Appl. No. 15/986,361 dated Jul. 11, 2019.

Non-Final Office Action for U.S. Appl. No. 15/986,451 dated Jun. 27, 2019.

Non-Final Office Action for U.S. Appl. No. 15/988,241 dated Jun. 27, 2019.

(56) References Cited

OTHER PUBLICATIONS

Non-Final Office Action for U.S. Appl. No. 15/396,475 dated Aug. 8, 2019.
Non-Final Office Action for U.S. Appl. No. 16/128,104 dated Aug. 21, 2019.
Notice of Allowance for U.S. Appl. No. 15/396,624 dated May 31, 2019.
Supplemental Notice of Allowance for U.S. Appl. No. 15/396,624 dated Aug. 14, 2019.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/396,475 dated Feb. 25, 2019.
Non-Final Office Action in U.S. Appl. No. 15/396,614 dated Mar. 7, 2019.
Non-Final Office Action in U.S. Appl. No. 15/396,468 dated Mar. 1, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,475 dated Nov. 30, 2018.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/988,472 dated Dec. 27, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/235,445 dated Apr. 2, 2020.
Non-Final Office Action for U.S. Appl. No. 16/236,713 dated May 29, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.

(56) References Cited

OTHER PUBLICATIONS

Non-Final Office Action for U.S. Appl. No. 15/396,475 dated Aug. 6, 2020.
Non-Final Office Action for U.S. Appl. No. 15/988,308 dated Sep. 8, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/229,310 dated Dec. 14, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/235,445 dated Mar. 26, 2021.
Final Office Action for U.S. Appl. No. 15/396,468 dated Feb. 10, 2021.
Final Office Action for U.S. Appl. No. 15/988,308 dated Jan. 28, 2021.
Non-Final Office Action for U.S. Appl. No. 16/854,970 dated Mar. 17, 2021.
Notice of Allowance for U.S. Appl. No. 15/396,475 dated Feb. 5, 2021.
Notice of Allowance for U.S. Appl. No. 15/986,406 dated Mar. 3, 2021.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/229,614 dated Jun. 29, 2021.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Application Serial No. 16/902,775 dated Apr. 26, 2021.
Corrected Notice of Allowance for U.S. Application Serial No. 16/902,775 dated Apr. 9, 2021.
Corrected Notice of Allowance for U.S. Application Serial No. 16/902,775 dated Jun. 11, 2021.
Final Office Action for U.S. Appl. No. 15/988,572 dated May 12, 2021.
Non-Final Office Action for U.S. Appl. No. 15/396,468 dated Jun. 1, 2021.
Non-Final Office Action for U.S. Appl. No. 17/038,323 dated Jul. 1, 2021.
Notice of Allowance for U.S. Appl. No. 15/986,451 dated May 5, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Corrected Notice of Allowability for U.S. Appl. No. 16/230,493 dated Jul. 8, 2021.
Corrected Notice of Allowance for U.S. Appl. No. 16/902,775 dated Jul. 30, 2021.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Final Office Action for U.S. Appl. No. 16/854,970 dated Aug. 18, 2021.
Non-Final Office Action for U.S. Appl. No. 16/918,085 dated Aug. 19, 2021.
Non-Final Office Action for U.S. Appl. No. 15/988,572 dated Aug. 25, 2021.
Non-Final Office Action for U.S. Appl. No. 16/985,444 dated Sep. 3, 2021.
Non-Final Office Action for U.S. Appl. No. 17/094,102 dated Sep. 20, 2021.
Notice of Allowance for U.S. Appl. No. 15/988,308 dated Jul. 30, 2021.
Notice of Allowance for U.S. Appl. No. 15/988,492 dated Jul. 30, 2021.
Corrected Notice of Allowance for U.S. Appl. No. 15/988,308 dated Oct. 20, 2021.
Final Office Action for U.S. Appl. No. 17/038,323 dated Nov. 1, 2021.

* cited by examiner

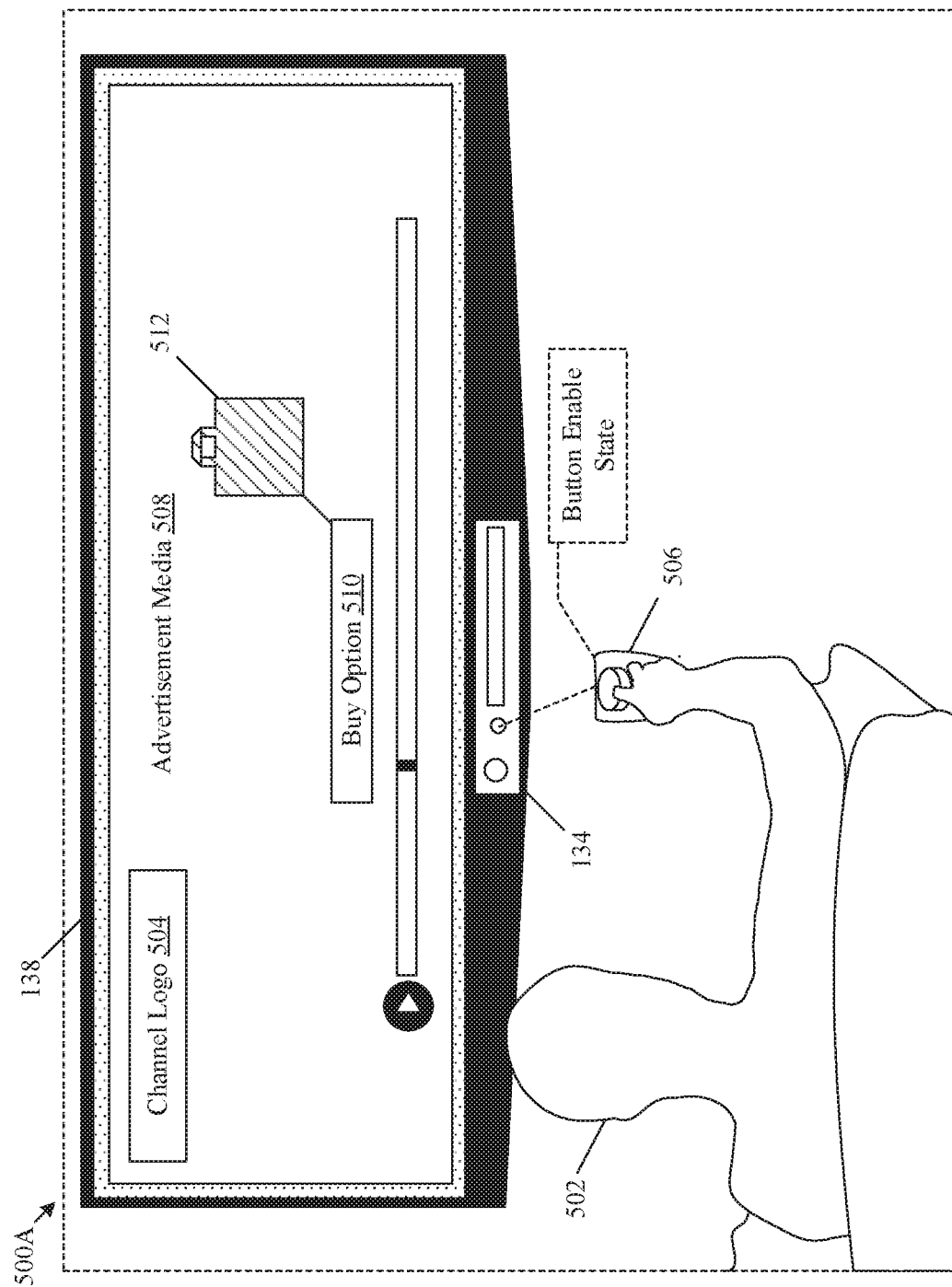

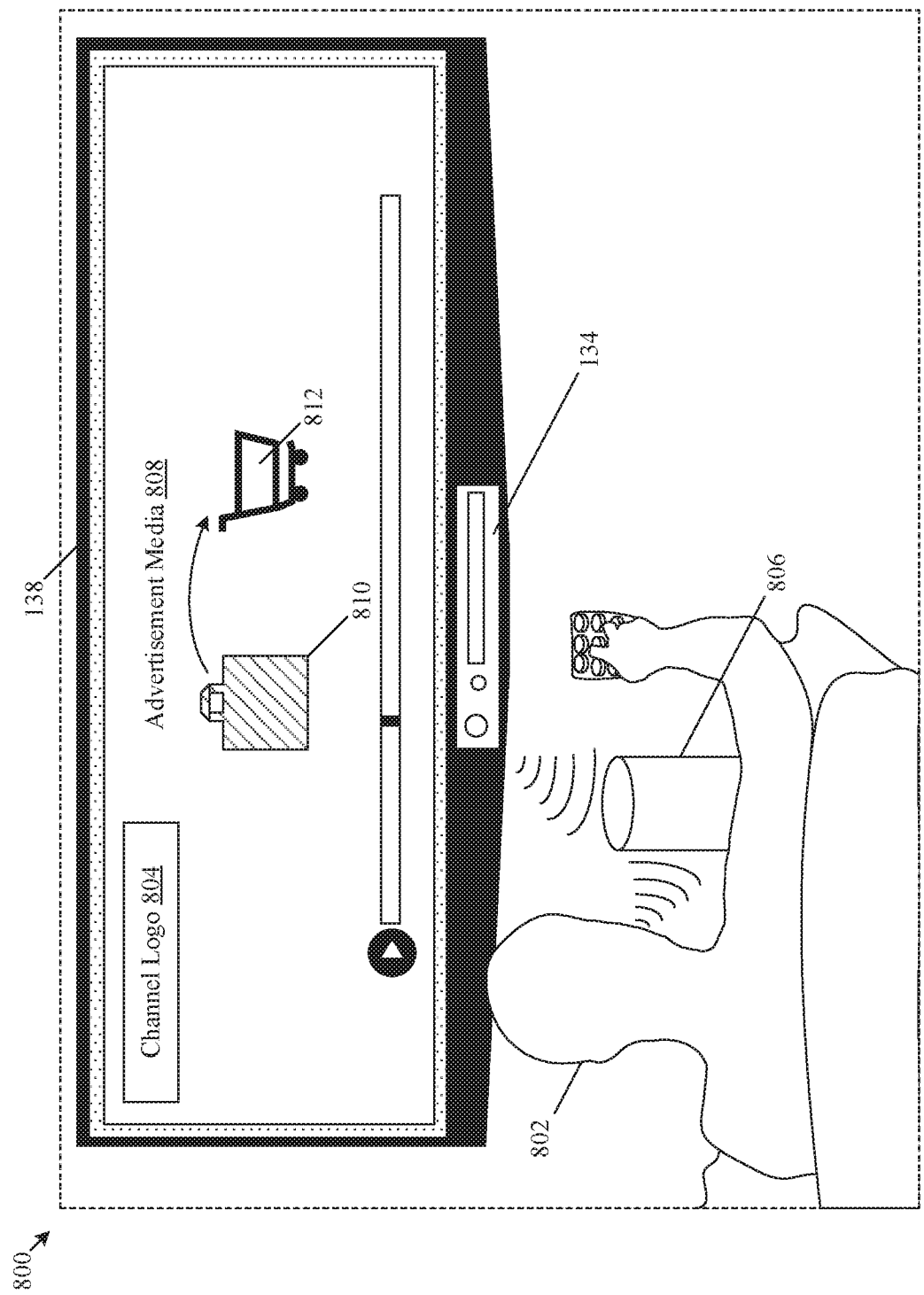

DELIVERY OF DIFFERENT SERVICES THROUGH DIFFERENT CLIENT DEVICES

CROSS-REFERENCE TO RELATED APPLICATIONS/INCORPORATION BY REFERENCE

This Application makes reference to, and claims priority to, and claims benefit from U.S. application Ser. No. 62/511,190, which was filed on May 25, 2017.

This Application also makes reference to:

U.S. application Ser. No. 15/988,308, filed on May 24, 2018;

U.S. application Ser. No. 15/988,572, filed on May 24, 2018; and

U.S. application Ser. No. 15/986,218, filed on May 22, 2018.

Each of the above stated Patent Applications is hereby incorporated herein by reference in its entirety.

FIELD OF TECHNOLOGY

Certain embodiments of the present disclosure relate to television and broadcasting technologies for streaming media networks. More specifically, certain embodiments of the present disclosure relate to delivery of different services through different client devices.

BACKGROUND

Recent technological advancements in broadcasting and media delivery technologies have paved the way for promoters to target relevant audiences across different media networks, such as linear networks, VOD networks, and mobile networks, with promotional content of products or services. Such media networks maintain a curated repository of media content that is delivered to users across different media platforms under ownership of the media network. The media content is distributed according to a schedule with slots dedicated to the promotional content of products or services. Such slots can be placed between two segments of the media content or over a defined region of the media content. The audience that engages with the media content is served with such promotional content.

The media networks that are owners of the media content, provide viewership information of served promotional content to associated promotional networks. However, such viewership information obscures the intent or interest of target audience to subscribe to the products or services upon watching associated promotional content. Additionally, promoters that prefer to target certain audiences for granular periods of time in a day, require intent or interest of a user in associated product or services for such granular periods of time. For example, a restaurant chain may wish to target audiences at different periods of time, such as before breakfast time, lunch time, and dinner time, to raise possibility of users to purchase products items from the restaurant. Moreover, such promoters may request to improve the intent of target audience to purchase promoted products or services, which may be a technically challenging task.

Currently, the ability to measure intent and further improve the intent in a way that encourages each target audience member to purchase product items is performed via detection of impressions or clicks on a promoted media content. However, with varying attention span of audience members, such impressions or clicks result in lower conversion rates. The impressions or clicks are considered an imperfect measure of intent in a time when audience members have a transient attention span. The current technological solutions are inefficient to measure the intent or interest of users to purchase products or services that are promoted through the promotional content. The transient attention span of a target audience affects the conversion of the target audience. Thus, advanced systems may be required that may transform that transient attention to selective sustained attention for viewed promotional content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and methods are provided for delivery of different services through different client devices, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 5A and 5B, collectively depict a second exemplary scenario that illustrates a client-side presentation of overlay graphics and a receipt of trigger response over presented overlay graphics, via an input device, in accordance with an embodiment of the disclosure.

FIG. 8 depicts a fifth exemplary scenario that illustrates client-side presentation of overlay graphics and receipt of voice responses over presented overlay graphics, handled by a smart conversational agent, in accordance with an embodiment of the disclosure.

DETAILED DESCRIPTION OF THE DISCLOSURE

Figure 1:
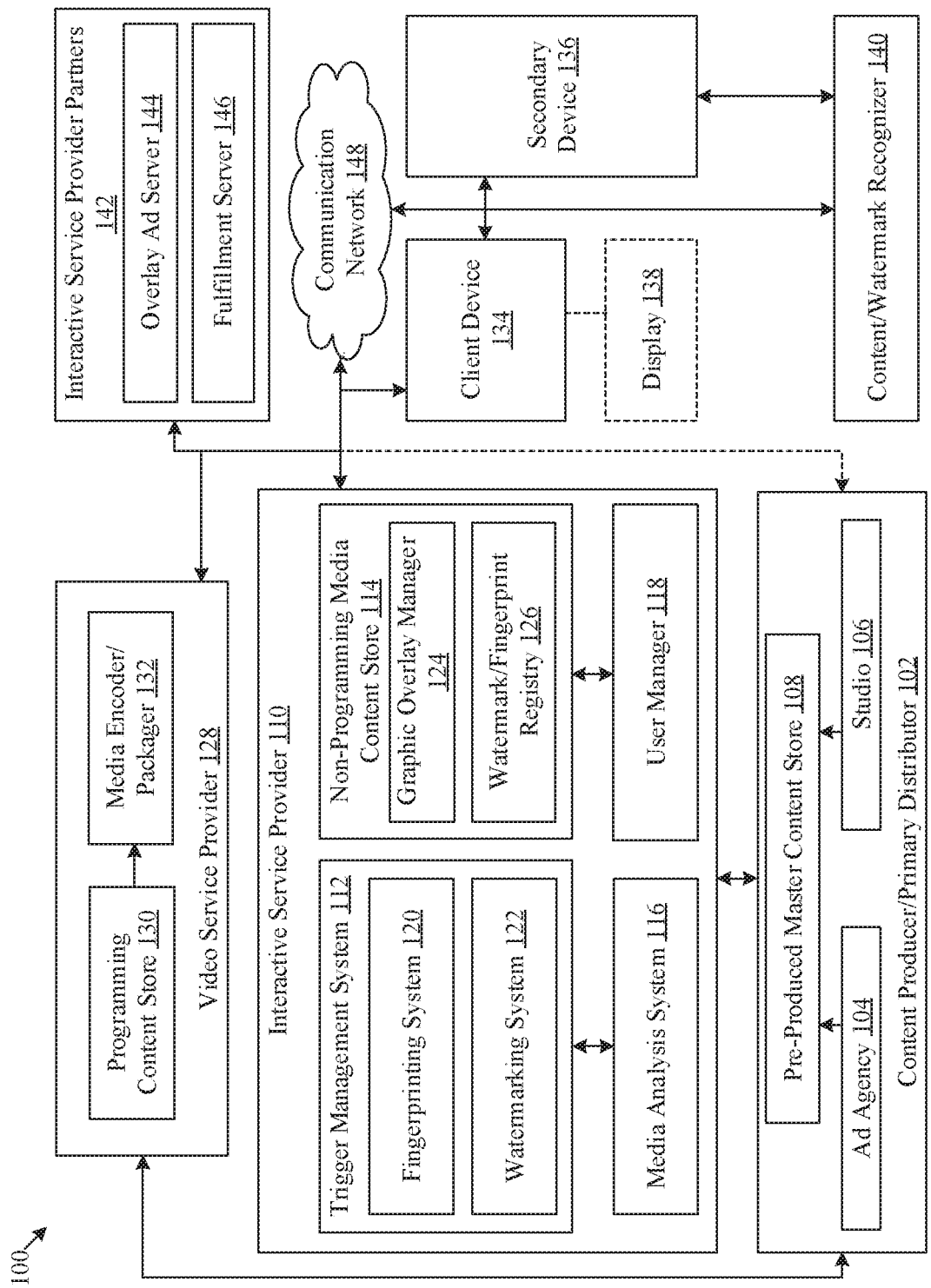
FIG. 1 is a block diagram that illustrates an exemplary network environment for delivery of different services through different client devices, in accordance with an exemplary embodiment of the disclosure.

Certain embodiments of the disclosure may be found in a system and method that handles delivery of at least one service over media content that is prepared by a video service provider for delivery to a client device. Examples of the different services that may be delivered through the client device 134, may include, but are not limited to an (over-the-top) OTT service through internet, a service that can be delivered through broadcast networks on different client devices, such as (Advanced Television Systems Committee) ATSC smart TVs (e.g., ATSC 3-enabled TV), presentable (visual, aural, etc.) services, consumable services, online services, purchase service, or other access independent services or dependent services. Also, different client devices, through which different services may be delivered, may be an ATSC smart TV capable of reading watermarks for a broadcast implementation, a set top box, an internet-based television, a smartphone, a tablet, and the like. Instead of an OTT service, different services may be delivered via an enabled set-top, ATSC3 TV, or Smart TV with Automatic Content Recognition (ACR), or a legacy TV with a smart second device that is cable of decoding audio watermarks in the media content.

Various embodiments of the disclosure include a system that may include an interactive service provider, a video service provider, and a client device. The interactive service provider may include a first processor, the video service provider may include a second processor, and the client device may include a third processor. The first processor may be configured to insert at least one of a plurality of digital watermarks or a plurality of digital fingerprints in media content that is received from a pre-produced master content store. The media content may include programming media content and non-programming media content. The second processor that handles delivery of the media content to the client device, may be configured to transmit a media stream (of the media content) to the client device. At least one of the plurality of digital watermarks or the plurality of digital fingerprints may be present at a plurality of event opportunities in the media content. The plurality of event opportunities may correspond to a plurality of candidate time intervals in a playback duration of the media content. The third processor may be configured to detect at least one of the inserted plurality of digital watermarks or the plurality of digital fingerprints in the playback duration of the media content at the client device. A plurality of overlay graphics may be rendered by the third processor on the media content for the plurality of candidate time intervals in the media content in the playback duration of the media content. The third processor may be further configured to activate one or more input devices paired with the client device and the rendered plurality of overlay graphics rendered on the media content. One or more trigger responses may be received further by the third processor over an activated overlay graphic rendered on the media content in the playback duration of the media content, via the activated one or more input devices. The third processor may be further configured display an interactive view on the client device, to enable delivery of at least one service in response to the received one or more trigger responses. The delivery of a service may be enabled at the client device in communication with a fulfillment server that may fulfill the delivery of the service to increase a user engagement to select the service.

Examples of the services may include, but is not limited to a direct payment, a direct transaction, or a direct notification for selected at least one product offering or at least one service offering, and a direct update of the selected at least one product offering or the at least one service offering on a shopping cart, a personalized list, or a social platform. In accordance with an embodiment, the first processor may be further configured to insert a plurality of trigger identifiers at the plurality of event opportunities in media content and the third processor may be configured to detect the inserted plurality of trigger identifiers in the playback duration of the media content at the client device.

In accordance with an embodiment, the first processor may be further configured to receive a request for analysis of the programming media content and non-programming media content. The analysis may include at least one digital fingerprinting and digital watermarking of the programming and non-programming media content.

In accordance with an embodiment, the first processor may be further configured to fingerprint the programming media content and the non-programming media content and generate fingerprint information for the programming media content and the non-programming media content. The fingerprint information may include at least one of acoustic fingerprint information or video fingerprint information for different segments of the programming media content and the non-programming media content. Such different segments may include audio frames or image frames of the programming media content and the non-programming media content.

In accordance with an embodiment, the first processor may be further configured to insert a plurality of digital watermarks in an audio portion or a video portion of the media content at the plurality of event opportunities in the media content. The first processor may be further configured to generate watermark information that may include metadata for at least one of an acoustic watermark or a video watermark inserted between different segments of the media content.

In accordance with an embodiment, each event opportunity may correspond to a specified event in the media content. The specified event may correspond to, for example, at least one of start credits, end credits, lull points, time-based marked regions, location-based marked regions, context-based marked regions, explicit scene start and end, product placement opportunities, or a combination thereof, within the media content. Each trigger identifier of the plurality of trigger identifiers may include, but is not limited to, of Society of Cable and Telecom Engineers (SCTE) 35 triggers, SCTE-104 triggers, playlists, manifest tags, Nielsen ID3 tags, inaudible beacons, image beacons, and data beacons.

In accordance with an embodiment, the third processor may be further configured to pair up the one or more input devices available in vicinity (i.e., a defined proximal range) of the client device or the secondary device. The one or more input devices may be paired, for example, via at least one of a Bluetooth network, a Wi-Fi network, an internet-based network, a wired local network, and an ad hoc network.

In some embodiments, a virtual voice assistant may be enabled on the input device or on at least one of the client device or the secondary device. The input device enabled with the virtual voice assistant may be configured to actively wait and listen for a trigger identifier in an audio portion of the media content. In some scenarios, the input device may be loosely paired (e.g., selectively paired for one or more specific functionality) or even unpaired with the client device, and therefore, the input device may listen for a trigger identifier in the audio portion of the media content automatically based on instructions from the interactive service provider.

In accordance with an embodiment, the third processor may be further configured to instruct the virtual voice assistant to detect at least one beacon within the playback duration of the media content. The third processor may be further configured to facilitate a conversation with a user associated with the client device, to receive a trigger response from the user. The trigger response may be received through a user's speech input.

In accordance with an embodiment, the non-programming media content may include promotional media content for at least one of a product offering or a service offering. The promotional media content may include at least one of graphical content, textual content, video content, or animated content.

In accordance with an embodiment, the third processor may be further configured to execute a check to decide whether to activate the one or more input devices (paired/unpaired) from a set of input devices or the render plurality of overlay graphics on the media content. The decision is based on the check executed on a defined criteria that is associated with records of previous service requests for the plurality of event opportunities on which the at least one service was delivered in past. The defined criteria may include, for example, at least one of a user-defined constraint, an inventory constraint, a specified threshold count of trigger responses for a product offering or a service offering promoted by the non-programming media content, and a contextually relevant event opportunity in the programming media content.

In accordance with an embodiment, the first processor may be further configured to instruct a delivery of notifications on at least one of the client device or the secondary device, in response to the received one or more trigger responses. The one or more trigger responses may correspond to one or more user interactions that may be received based on at least one of a touch input, a gesture input, a haptic input, and a voice command input.

FIG. 1 is a block diagram that illustrates an exemplary network environment for a third party-controlled delivery of different services through different client devices, in accordance with an exemplary embodiment of the disclosure. With reference to FIG. 1, there is shown a network environment 100 that includes a content producer/primary distributor 102. The content producer/primary distributor 102 may include an ad agency 104, a studio 106, and a pre-produced master content store 108. There is further shown an interactive service provider 110, which may include a trigger management system 112, a non-programming media content store 114, a media analysis system 116, and a user manager 118. The trigger management system 112 may include a fingerprinting system 120 and a watermarking system 122. Similarly, the non-programming media content store 114 may include a graphic overlay manager 124 and a watermark/fingerprint registry 126.

There is further shown a video service provider 128, a client device 134, a secondary device 136, and a display 138. The video service provider 128 may include a programming content store 130 and a media encoder/packager 132. In some embodiments, the display 138 may be a separate device communicatively coupled to the client device 134. In other embodiments, the display 138 may be integrated with the client device 134. There is further shown a content/watermark recognizer 140 and interactive service provider partners 142, which may include an overlay ad server 144, and a fulfillment server 146. The aforementioned components in the network environment 100 may be communicatively coupled to each other, via a communication network 148.

The content producer/primary distributor 102, the interactive service provider 110, the video service provider 128, the client device 134, and the interactive service provider partners 142 may together be a part of a system of networks, devices, and/or circuitries, interconnected to each other via the communication network 148. Although not shown in FIG. 1, the interactive service provider 110 may include a first processor, the video service provider may include a second processor, and the client device may include a third processor. The first processor, the second processor, and the third processor may be configured to execute all the operations of the interactive service provider 110, the video service provider 128, and the client device 134, respectively. The operations may be inclusive of all the operations described in the present disclosure as well as other operations that is omitted from the disclosure for the sake of brevity.

The content producer/primary distributor 102 may be a server or a distributed network of servers that may be managed, owned, and operated by a producer entity or a primary distributor entity. The content producer/primary distributor 102 may store and distribute media content, which includes programming media content (e.g., television shows, live programs, trailers, movies, etc.) as well as non-programming media content (e.g., advertisement videos, graphic advertisements (e.g., bugs, logos, banners, tickers, popups, $\frac{1}{3}^{rd}$ graphics, etc.), promotional videos, and promotional audio, etc.). Also, the content producer/primary distributor 102 may prepare, package, and distribute the media content (programming and/or non-programming) to different networks that serve the media content to different client devices, through a secure (or open) content delivery network. The content producer/primary distributor 102 may include the ad agency 104, the studio 106, and the pre-produced master content store 108 coupled to the ad agency 104 and the studio 106.

The ad agency 104 may be a content producer that creates, plans, and handles different tasks associated with production and distribution of non-programming media content (which may be advertisements or other promotional content). The ad agency 104 may produce commercial videos, radio commercials, online advertisements, out-of-home advertisements, and the like, based on an advertising campaign that may be specified by a product/service promoter or owner.

The studio 106 may be a platform that facilitate content producers to create, edit, curate, and/or package different types of non-programming media content for distribution to different programming networks (e.g. the video service provider 128) that stream programming media content to different client devices (e.g., the client device 134). In some embodiments, the studio 106 may be an application platform that may be configured to produce media content and curate the produced media content for distribution to different programming networks. In certain scenarios, certain ad agencies and studios may work with a separate interactive service provider to transmit program and non-program media content, which may already have a plurality of watermarks inserted or fingerprints taken, to the video service provider 128.

The pre-produced master content store 108 may be a media server or a distributed network of media servers, which may be a part of a non-programming content delivery network for producers/distributors of the non-programming media content. The pre-produced master content store 108 may be configured to receive produced and/or curated media content (e.g., TV shows, live shows, movies, video ads, promotions videos, graphics (e.g., bugs, logos, $1/3^{rd}$ graphics, banners, etc.,), promotional audio, etc.) from the ad agency 104 and the studio 106. The pre-produced master content store 108 may be further configured to maintain a curated repository of media content that is received from the ad agency 104, the studio 106, or other content production and distribution platforms. The pre-produced master content store 108 may also hold programming content that may need to be analyzed and have trigger identifiers inserted to mark product placement, e.g., a positive sentiment beach scene over which non-programing content may be overlaid for certain client devices.

The interactive service provider 110 may be a third party service network (e.g., an affiliate network) that may handle delivery of at least one service over media content that is prepared by the video service provider 128 for delivery to the client device 134. The interactive service provider may include a server or a distributed network of servers executing different operations on media content (programming or non-programming) received from different content producers/primary distributors (e.g., the content producer/primary distributor 102). Different operations may be executed based on requirements of different video service providers. The requirements may include at least one of media content (programming or non-programming) analysis, watermarks insertion, and fingerprints generation. The media content (programming or non-programming) may be received from different content producers/primary distributors (e.g., the content producer/primary distributor 102) and a modified version of the media content (after execution of different operations) may be transmitted back to intended content producers/primary distributors (e.g., the content producer/primary distributor 102).

The trigger management system 112 may comprise suitable logic, circuitry, and interfaces that may be configured to fingerprint and/or schedule insertion of different watermarks in media content (programming and/or non-programming) received from the content producer/primary distributor 102. The fingerprints and watermarks may be utilized at the client device 134 to present interactive options over programming or non-programming media content (e.g., promotional graphics or promotional videos) streamed at the client device 134. The trigger management system 112 may be implemented as a computational circuitry or as a set of instructions that are executed on a computational circuitry on one or more servers of the interactive service provider 110.

The non-programming media content store 114 may be a server, a distributed network of servers, or a set of applications that are executed on the server or the distributed network of servers. The operations of the non-programming media content store 114 may be handled by the interactive service provider 110. The non-programming media content store 114 may be configured to manage overlay of graphical assets on different client devices (e.g., the client device 134) and further maintain a database of watermark information or fingerprint information for media content (programming or non-programming) received from the video service provider 128.

In accordance with an embodiment, the media analysis system 116 may comprise suitable logic, circuitry, and interfaces that may be configured to determine the one or more event opportunity points (e.g., time slots in media content) within the media content (programming or non-programming) that is received from a content producer/primary distributor. The media analysis system 116 may be further configured to identify information associated with different segments (e.g., specific portions, specific scenes, POD durations, commercial breaks, etc.) in the media content. The information may be identified based on analysis of a context, a user preference, or a defined goal (associated with flights of an advertisement campaign) of different segments in the media content (programming and/or non-programming). Such information may include different attributes, for example, a duration, a tag or metadata, a suitable overlay asset for an event opportunity, a total number of event opportunities in a segment, and the like. The determined one or more event opportunity points and associated information may be transmitted to the trigger management system 112 and the non-programming media content store 114.

The user manager 118 may comprise suitable logic, circuitry, and interfaces that may be configured to manage processes and requests that may be associated with user preferences, user activities (or user footprints), user selections, or user profiles across different client devices (e.g., the client device 134). Such user preferences, user activities, user selections, or user profiles may be stored and managed as user-related data in a user database (not shown in FIG. 1). The user-related data may be received as structured and relational or unstructured and non-relational data from one or more data sources. The user database may comprise suitable logic, circuitry, and interfaces that may be configured to store and manage the user-related data in real time. The user-related data may comprise at least a set of user-authentication data, a subscription data, user preferences, user attributes (e.g., demographic profile (e.g., age, gender, location, income details, etc.) and user footprints (e.g., cookies-based data) that defines user activities on applications/client devices associated with a user. Every time a user request is received by the video service provider 128 to stream the programming media content to a client device (e.g., the client device 134), the user request may be communicated, via the communication network 148, to the user manager 118. In certain implementations, the user manager 118 may be configured to facilitate transactions or payments made on options delivered over the programming media content from the video service provider 128, in conjunction with a transaction system.

The fingerprinting system 120 may comprise suitable logic, circuitry, and interfaces that may be configured to fingerprint an audio portion and/or a video portion of the media content (programming and/or non-programming media content) that is received from a specific content producer/primary distributor (e.g., the content producer/primary distributor 102). The fingerprinting system 120 may also fingerprint the programing content to serve as a triggering mechanism for different overlay opportunities in the media content. The fingerprinting system 120 may generate fingerprint information, which may include at least one of acoustic fingerprint information or video fingerprint information for different segments (or selected audio or image frames) of the media content. The generated fingerprint information for a non-programming asset may be utilized to uniquely identify and detect playback of a programming or a non-programming asset at different client devices (e.g., the client device 134).

The watermarking system 122 may comprise suitable logic, circuitry, and interfaces that may be configured to insert digital watermarks (perceptible or imperceptible) in an audio portion and/or a video portion of the media content received from a specific content producer/primary distributor (e.g., the content producer/primary distributor 102). The watermarking system 122 may generate watermark information, which may include metadata for at least one of an acoustic watermark or a video watermark inserted between different segments (or selected audio or image frames) of the media content. The generated watermark information for a programming and/or a non-programming asset may be utilized to uniquely identify and detect playback of a programming and/or a non-programming asset at different client devices (e.g., the client device 134). The watermarking system 122 may also watermark the programing content to serve as a triggering mechanism for different overlay opportunities in the media content.

The graphic overlay manager 124 may comprise suitable logic, circuitry, and interfaces that may be configured to manage an overlay schedule database for a repository of overlay graphics (e.g., logos, bugs, banners, tickers, ⅓$^{rd}$ graphics, sliders, etc.). The overlay schedule may be delivered to the graphic overlay manager 124 by different content producers/primary distributors (e.g., the content producer/primary distributor 102). The overlay schedule database may include details of what to overlay, when to overlay, for what duration to overlay and how that overlay should be presented at different devices (e.g., the client device 134).

The watermark/fingerprint registry 126 may comprise suitable logic, circuitry, and interfaces that may be configured to manage a database or a set of databases for different types of information received from the fingerprinting system 120 and the watermarking system 122. The different types of information may include, but not limited to, fingerprint information, and watermark information for each portion (or asset) in received media content from the content producer/primary distributor 102. Such types of information may be utilized to search for metadata and details of an event trigger that is detected at different client devices (e.g., the client device 134). Also, such types of information may be utilized to tracks watermarks associated with programming media content. The event trigger may correspond to an event opportunity, details of which may be specified in the watermark/fingerprint registry 126.

The video service provider 128 may be a distribution network (e.g., a television network or a media streaming network) that handles production, curation, and distribution of programming media content that may be prepared along with the media content received from the content producer/primary distributor 102, or other sources. The video service provider 128 may also handle delivery of media content (programming and/or non-programming) to the client device 134. The video service provider 128 may be a first party distribution network that may store programming media content along with other programming or non-programming assets (e.g. the media content received from the content producer/primary distributor 102). The distribution of programming media content may be managed via different delivery channels, which are managed by the video service provider 128, for example, broadcast channels, internet-based media streaming applications, web channels, podcast channels, radio channels, and the like. The video service provider 128 may include the programming content store 130 and the media encoder/packager 132.

The programming content store 130 may be a media server or a distributed network of media servers, which may be a part of a programming content delivery network that is handled by the video service provider 128. The programming content store 130 may be a curated repository of different programming media assets that may be stored along with the media content received from the pre-produced master content store 108 of the content producer/primary distributor 102. In case a user request for programming media content is received, the programming content store 130 may be configured to deliver different programming media assets (e.g., episodes of different shows, movies, trailers, etc.) along with non-programming media content (e.g., video ads, audio ads, overlay graphics, or other promotional content, etc.) to the media encoder/packager 132.

The media encoder/packager 132 may comprise suitable logic, circuitry, and interfaces that may be configured to package different programming media assets to obtain programming media content that may be further prepared with non-programming media content at different event opportunities in the programming media content. The media encoder/packager 132 may be further configured to insert a plurality of trigger identifiers (e.g., Society of Cable and Telecom Engineers (SCTE)-35 triggers, SCTE-104 triggers, Nielsen ID3 tags, inaudible beacons, data beacons, etc.). The plurality of trigger identifiers may be further utilized to trigger different user options at client devices (e.g., the client device 134)). The media encoder/packager 132 may be further configured to encode the prepared programming media content and encapsulate the encoded programming media content in a media stream (e.g., a media stream that includes H.264 video stream and AAC audio stream or an MPEG-2 TS stream (where MPEG stands for Moving Pictures Experts Group)). Such media stream may then be delivered to different client devices (e.g., the client device 134) via the communication network 148.

The client device 134 may comprise suitable logic, circuitry, and interfaces that may be configured to request the video service provider 128 to stream programming media content at the client device 134. The client device 134 may also request the video service provider 128 to stream programming media content (e.g., TV shows, live matches, movies, etc.) along with further requests to the interactive service provider 110 for activation of trigger inputs (overlaid graphical buttons or physical input devices) to engage (e.g., purchase, sell, bid, share, etc.) with non-programming media content presented along with the programming media content. Such trigger inputs may be activated for various event opportunities in the programming media content, for example, television programming or on-demand shows (e.g. dramas, movies, etc.), at a display view of the client device 134. Examples of the client device 134 may include, but are not limited to a Set-Top-Box (STB), an (internet protocol television) IPTV, a hybrid box, a cable converter, a smartphone, a laptop, and a tablet, a smart TV, a digital media player (for example, "Fire" TV, "Apple" TV, etc.). Also the client device 134, through which different services may be delivered, may be an ATSC smart TV capable of reading watermarks for a broadcast implementation, a set top box, an internet-based television, a smartphone, a tablet, a set-top box, an ATSC3 TV, or a Smart TV with ACR (automatic content recognition), or a legacy TV with a smart second device that is cable of decoding an audio watermark.

In some embodiments, the client device 134 may execute the playback of the media content via the display 138 that may be peripheral device or integrated with the client device 134. Examples of the display 138 may include, but not limited to a television display (e.g. Liquid Crystal Display (LCD), Light Emitting Diode (LED) display, organic light emitting diodes (OLED) display, plasma display, Thin-Film Transistor (TFT) display, etc.) a projector screen, a computer monitor, a three dimensional (3D) display, and an (Augmented Reality/Virtual Reality (AR/VR display).

The secondary device 136 may comprise suitable logic, circuitry, and interfaces that may be configured to display trigger inputs (overlaid graphic buttons) in response to an event trigger that occurs based on a detection of a trigger identifier with the playback of the programming media content at the client device 134. Additionally, the secondary device 136 may be configured to display notifications, payment options, or, promotional content, via at least one delivery platform accessible on the secondary device 136. The one or more delivery platforms may correspond to a communication exchange platform that may incorporate visual, audible, or executable data to serve notifications or associated promotional content on the secondary device 136. Example of the one or more delivery platforms may include, but not limited to an Email platform, a mobile messaging platform, a webpage, a podcast, and a push notification. Examples of the secondary device 136 may include, but not limited to smartphones, tablets, phablets, smart watches, smart glasses, and smart speakers with or without artificially intelligent (AI) conversational agents. In some cases, the secondary device 136, for e.g., as a smart conversational agent, may be configured to detect the audio watermark itself and may not be reliant on the client device 134 for detection.

The content/watermark recognizer 140 may comprise suitable logic, circuitry, and interfaces that may be configured to identify inserted watermarks or media content based on fingerprints at the client device 134, based on an integration with the interactive service provider 110. Alternatively stated, the content/watermark recognizer 140 may detect and/or identify information associated an inserted watermark or a fingerprint while the programming media content (along with non-programming media content) is played at the client device 134. The content/watermark recognizer 140 may communicate with the interactive service provider 110, via a set of calls or other instructions (e.g., API calls), to identify information (e.g., watermark information, fingerprint information, etc.) in response to a detection of an event trigger at the client device 134.

The interactive service provider partners 142 may be a group of service networks (e.g., different affiliate networks) that may have partnerships and affiliations with the interactive service provider 110 and the content producer/primary distributor 102. The interactive service provider partners 142 may include a server or a distributed network of servers that serve overlay advertisement graphics (or media content) to the client device 134 in response to request from the client device. Also, the different operations on media content (programming or non-programming) for different video service providers (e.g., the video service provider 128). Different operations may be executed based on requirements of different video service providers.

The overlay ad server 144 may comprise suitable logic, circuitry, and interfaces that may be configured to design or produce and distribute overlay graphics along with associated metadata to the client device 134 in response to requests received from the client device 134. A repository of overlay graphics (e.g., machine readable optical labels (e.g., a QR code), bugs, logos, tickers, banners, sliders, $\frac{1}{3}^{rd}$ graphics, full screen graphics, etc.) may also be maintained at the overlay ad server 144.

The fulfillment server 146 may comprise suitable logic, circuitry, and interfaces that may be configured to deliver a service (e.g., payment service, order service, bid/reverse bidding service, registration, subscription, social sharing, etc.) to a user in response to a request from the client device 134.

The communication network 148 may comprise suitable logic, circuitry, and interfaces that may be configured to manage a plurality of network ports and a plurality of communication channels for transmission and reception of communication data (for e.g. media streams, request data, metadata, database files, web data, etc.). The communication data may correspond to data received and/or exchanged among the content producer/primary distributor 102. The video service provider 128, the client device 134, the secondary device 136, the content/watermark recognizer 140, and interactive service provider partners 142, via the communication network 148. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 148 for implementation of communication protocols on one or more communication requests from at least one of the one or more computing devices. Examples of the communication protocol may include, but not limited to a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 148 may be an internet based network. For such networks, a delivery standard may be used, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S. Although, only a single communication network has been illustrated in FIG. 1, there may be more than one communication networks that may or may not share resources to optimally deliver programming content and other non-programming content to various connected client devices.

In operation, a request (i.e. a user-initiated or an automatic client initiated request) may be transmitted by the client device 134 to the interactive service provider, via the communication network 148. A media application may be installed at the client device 134. The media application may be managed by the interactive service provider 110. The request may be made for an instructed delivery and playback of programming media content at the client device 134.

In some embodiments, along with the request, the client device 134 may transmit request information, such as user information, constraint information (e.g., device constraints, network constraints, user-specified constraints, etc.), stored/collected user preferences (e.g., favorite shows, preferred products/services, frequently/recently searched terms, etc.) to the interactive service provider 110. The request information may further include user attributes (e.g., demographic details (such as age, gender, income bracket, and location), and digital footprints (i.e., traceable, inferred or analyzed digital activities, actions, contributions, and communications on internet or digital devices (such as the client device 134 or the secondary device 136). The request along with the request information may be stored in a user database of the user manager 118 present in a network of the interactive service provider 110. In some embodiments, the interactive service provider 110 may be further configured to transmit the request along with the request information to the video service provider 128, via the communication network 148.

In some embodiments, the client device 134 may be communicatively coupled to a proxy server (not shown in FIG. 1) that acts as an intermediary between the client device 134 and at least one of the content producer/primary distributor 102, the interactive service provider 110, the video service provider 128, the content/watermark recognizer 140, or the interactive service provider partners 142. All the requests from the client device 134 may be parsed, processed, and/or routed by the proxy server to at least the content producer/primary distributor 102, the interactive service provider 110, the video service provider 128, the content/watermark recognizer 140, or the interactive service provider partners 142.

The content producer/primary distributor 102 may be configured to transmit media content (programming and/or non-programming, for e.g., TV shows, live shows, movies, advertisement videos, graphics (e.g., bugs, logos, banners, tickers, popups, ⅓rd graphics, etc.), promotional videos, promotional audio, etc.) to the interactive service provider 110. The non-programming media content may include promotional media content for at least one of a product offering or a service offering. The promotional media content may include at least one of graphical content, textual content, video content, or animated content. The programming and/or non-programming media content may be transmitted by the content producer/primary distributor 102 in an attempt to increase user engagement with the non-programming media content that may be played along with programming media content at the client device 134. Examples of the programming media content may include, but are not limited to episodes of different shows, movies, live matches, trailers, program recap, programs to be aired, program highlights, sports highlight, sports analysis, news feed, or other television programming, and on-demand shows (e.g. pre-produced or live shows, etc.).

The interactive service provider 110 may be configured to receive the non-programming media content from the content producer/primary distributor 102 (i.e., from the pre-produced master content store 108 of the content producer/primary distributor 102). The interactive service provider 110 may be further configured to receive the request, for media analysis, fingerprinting, and/or watermark insertion in the media content, received from the content producer/primary distributor 102.

The media analysis system 116 may be configured to analyze the media content received from the content producer/primary distributor 102 to identify slots, contextual points, product placement opportunities, etc., in the media content. More specifically, the media analysis system 116 may be configured to analyze the programming media content (i.e., TV shows, movies, etc.) to look for non-programming content, such as brand logos, but may also look for more contextually relevant opportunities, such as a coffee scene or a breakfast scene, or a restraint scene. Such contextually relevant opportunities may translate to ad or offer placement opportunities that may be relevant to an advertiser and a non-programming media element can be overlaid at the contextually relevant opportunity, e.g., a burger order logo (user-selectable) over a breakfast scene. The media analysis system 116 may also analyze advertisements so as to make such advertisements interactive at the time of presentation on the client device 134.

In some embodiments, the media analysis system 116 may implement a content recognition service (not shown in FIG. 1) that may be configured to execute operations associated with content recognition on the media content received from different content producers/content distributors (e.g., the content producer/primary distributor 102). The content recognition service may operate as a statistical signal processing engine that may execute operations for the recognition of programming and/or non-programming assets (e.g., contextually relevant segments in programs, programming videos, video advertisements, etc.) in the media content. The content recognition service may further identify different attributes (e.g., audio or video fingerprints) of the programming and/or non-programming media assets (as part of media content) through implementation of a technique, such as acoustic fingerprinting, digital watermarking, and digital video fingerprinting. In certain implementations, supervised or unsupervised machine learning, deep learning, neural network, or artificially intelligence based techniques may be implemented to facilitate precise determination of different attributes of the media items in the media content. In certain embodiments, the content recognition service may be implemented on a specialized circuitry or an application at the trigger management system 112. For such implementations, the content recognition service may utilize computational resources of a graphical processing unit (GPU) at the trigger management system 112.

After the analysis, different features along with metadata and other details of different programming and/or non-programming assets (as part of the media content) may be identified by the media analysis system 116. Examples of the different features may include, but not limited to contextual information of different scenes/portions of a programming and/or a non-programming asset, a point in time to trigger an overlay in a programming and/or a non-programming asset, a suitable position in a programming and/or a non-programming asset where an overlay may be placed, or other playback information (e.g., playback duration, start/end time stamps, etc.). The contextual information may be a context of a scene, for example, sports, health, baby products, car promo, and the like. A record of the analysis may be updated in the trigger management system 112 and the trigger management system 112 may store the record generated post the analysis of the programming media content and the non-programming media content.

In some embodiments, the received request from the content producer/primary distributor 102 may also include information that specifies a type of detection that should be used at the client device 134. The type of detection may include, but not limited to watermark detection, fingerprint detection, tags-based detection, or a combination thereof. Based on the type of detection, the interactive service provider 110 may insert fingerprint, watermark, or associate tags with the programming media content. In other embodiments, in absence of such information with the received request, the interactive service provider 110 may be configured to optimally select a type of detection suitable for execution at the client device 134.

In accordance with an embodiment, the fingerprinting system 120 may be configured to fingerprint the programming media content and the non-programming media content and generate fingerprint information for the programming media content and the non-programming media content. The fingerprint information may include at least one of acoustic fingerprint information or video fingerprint information for different segments (or selected audio or image frames) of the programming media content and the non-programming media content. The generated fingerprint information for an asset (programming and/or non-programming) may be utilized to uniquely identify and detect playback of the asset at different client devices (e.g., the client device 134). As an example, the acoustic fingerprint information may include, but not limited to an average zero crossing rate, an estimated tempo, an average spectrum, a spectral flatness, and prominent tones across a set of frequency bands, a bandwidth, and a spectrogram for a segment of the audio portion. Similarly, the video fingerprint information may include, but not limited to, histogram data, intensity information, motion vectors, feature points extracted based on application of at least one of Scale Invariant Feature Transform (SIFT), Speeded Up Robust Features (SURF), Oriented Brief and Fast (ORB), and Histogram of Oriented Gradients (HOG), and the like.

In accordance with another embodiment, the watermarking system 122 may be configured to insert digital watermarks (perceptible or imperceptible) in an audio portion and/or a video portion of the non-programming media content at different event opportunities in the media content. The watermarking system 122 may generate watermark information, which may include metadata for at least one of an acoustic watermark or a video watermark inserted between different segments (or selected audio or image frames) of the media content. The generated watermark information for an asset (programming and/or non-programming) in the media content may be utilized to uniquely identify and detect playback of the assets at the client device 134. The watermark information may further include details (e.g., title, duration, start time, end time, tags, etc.) of an asset in the media content. The trigger management system 112 may be further configured to store the generated fingerprint information and the watermark information in the watermark/fingerprint registry 126.

In some cases, the watermarks and/or fingerprints may be primarily intended for the programming media content to identify events for triggers. The non-programming assets may be typical fingerprinted or watermarked to detect playback for tracking or in the case the non-programming content is overlaid in the broadcast distribution to make it interactive on the enabled client devices (e.g., the client device 134). As an example, in a TV show with a beach scene, fingerprints, watermarks, or trigger identifiers, may be generated for a positive sentiment beach scene. Such fingerprints, watermarks, or trigger identifiers may indicate an event opportunity for which a personalized travel or vacation offer may be served on the client device 134, for viewers that may like going to the beach. The watermark/fingerprint registry 126 may also store information around non-programming content, such as a promotional overlay for a new TV show, to enable the interactive service provider 110 to keep a track of users who may have viewed the promotional overlay for the new TV show. The interactive service provider 110 may also allow the user (through the client device 134 or other input devices) to act upon the promotional overlay, such as scheduling a DVR recording or adding it to the watch list.

In certain embodiments, the watermarking system 122 may also analyze and insert digital watermarks in the programming media content to enable the client device 134 (or other input devices) engage (in response to user inputs) with different product placements during the playback of a program, e.g., a TV show. Also, such digital watermarks may also be used to garner revenue from contextual advertising, i.e., a "food brand" bug (i.e., an on-screen graphic) may be presented during a breakfast scene in a program played at the client device 134, where coffee is consumed in the breakfast scene. Also, such digital watermarks may be utilized to insert a logo on a coffee cup itself to enable real-time product placement to a highest bidder for that customer.

In certain embodiments, the interactive service provider 110 may be a $3^{rd}$ party server and may not have direct communication (and/or a partnership) with the video service provider 128 (e.g., a first party). Instead, the interactive service provider 110 may only have a direct communication with the content producer/primary distributor 102, the client device 134, and the interactive service provider partners 142. Therefore, after insertion of at least one of fingerprints (or an identifier to a generated fingerprint), digital watermarks with the media content, the interactive service provider 110 may be further configured to transmit the media content inserted with at least one of watermarks or fingerprints back to the content producer/primary distributor 102. The content producer/primary distributor 102 may have a direct communication (or partnership) with the video service provider 128 and therefore, the content producer/primary distributor 102 may be further configured to transmit the media content inserted with at least one of watermarks or fingerprints to the video service provider 128.

In the video service provider 128, the programming content store 130 may be configured to receive the media content (programming and/or non-programming) from the pre-produced master content store 108 of the content producer/primary distributor 102. The received media content (including the programming media assets (e.g., individual episodes, segments, or curated portions of shows, live content, or pre-prepared content) may be stored at the programming content store 130. The media content inserted with at least one of watermarks or fingerprints may be further transferred to the media encoder/packager 132. The media encoder/packager 132 may be further configured to prepare the media content that may include the programming media content prepared with the received non-programming content. More specifically, during preparation, different programming media assets may be prepared with different non-programming media assets (as part of the non-programming media content) at different event opportunities. The packaging may be done such that different non-programming media assets are inserted at pre-assigned spots present in between different programming media assets.

In some embodiments, a trigger scheduler (not shown in FIG. 1) in the interactive service provider 110 may be configured to generate a plurality of trigger identifiers (e.g., a trigger identifier may include "255 bytes" or "32 bytes" of information that includes at least an asset or event identifier (ID)). When detected, such trigger identifiers may indicate event opportunities in a playback duration of the media content that may be transmitted by the video service provider 128 at the client device 134.

The event opportunities may correspond to candidate time intervals, which may be pre-specified or identified in real time or near time based on an analysis of the media content. Such event opportunity may correspond to a specified event in the media content and such specified event may correspond to, but are not limited to, start credits, end credits, lull points, time-based marked regions, location-based marked regions, context-based marked regions, explicit scene start and end, and product placement opportunities, within the programming media content. The trigger scheduler may also generate event information for each generated trigger identifier. The event information may include, but are not limited to, asset ID of a non-programming media asset, an overlay position, a graphic asset that may be overlaid, an overlay duration, and an IP address of the overlay ad server 144, and/or other presentation attributes.

The trigger scheduler may be further configured to insert the plurality of trigger identifiers (e.g., Society of Cable and Telecom Engineers (SCTE)-35 triggers, SCTE-104 triggers, Nielsen ID3 tags, .m3u8 playlists, .mpd manifest tags, inaudible beacons, data beacons, etc.) at a plurality of event opportunities (specified in an event opportunity store (not shown in FIG. 1)) in the media content prepared by the media encoder/packager 132. In some cases, the prepared media content may have a client manifest, which is transmitted along with a media stream of the prepared media content. The client manifest may be used to stream fragments and may include the plurality of trigger identifiers along with the trigger metadata (e.g. trigger duration, trigger end time, trigger start time, etc.). The trigger scheduler may be further configured to store the generated event information associated with each trigger identifier in a trigger registry (not shown in FIG. 1) that is a part of the interactive service provider 110.

In certain embodiments, the interactive service provider 110 may also include a tagging system (not shown in FIG. 1). The tagging system may place one or more tags with the non-programming media content. Such tags may be invoked at the client device 134 while the non-programming media content is played at the client device 134. Each tag may include, but is not limited to, at least a pointer for a defined playback duration in a candidate time interval (e.g., "00:33:43"-"00:35:43" or "2 minutes" from "00:33:43"), information (e.g., IP address, permission, etc.) to access the overlay ad server 144. The one or more tags may be transmitted along with a client manifest (to the client device 134) that may be created by the media encoder/packager 132. The client manifest may be interpreted at the client device 134 and the one or more tags present along with the client manifest may be represented by at least one of a signal, a beacon, a SCTE-35 message, a marker, textual information, binary information, visual information, aural information, and the like.

In certain embodiments, the video service provider 128 may be configured to modify one or more of the plurality of trigger identifiers inserted in the prepared media content at the media encoder/packager 132. For example, the modification may include, but not limited to, resetting the position of the trigger identifier in the prepared media content, a deletion of a trigger identifier previously inserted in the prepared media content, a change in metadata of the trigger identifier (e.g., trigger ID), and the like. In other embodiments, instead of modification, the video service provider 128 may be configured to add a new trigger identifier at an event opportunity in the prepared media content. The video service provider 128 may be configured to generate event information for each modified trigger identifier or each new trigger identifier added in the prepared media content. After every modification or update, the video service provider 128 has to communicate the generated event information and/or an event log (which includes a list of modifications) for an update at the trigger registry. The trigger registry may include databases that may be sorted, curated, updated, and structured such that in event of a call from the client device 134, a search may be executed in such databases to extract information (i.e., event information) that corresponds to detected trigger identifier at the client device 134.

In an exemplary scenario, the video service provider 128 is bypassed by the interactive service provider 110 and the video service provider 128 may operate directly with the content producers/primary distributors 102. However, in some cases, the video service provider 128 may have a specific interactive infrastructure to trigger interactively, such as, credit squeeze advertising, on the client device 134. Such interactivity may be enabled on the client device 134 by having the client device 134 direct a call (or a request) to the video service provider 128, without the use of trigger identifiers.

The media encoder/packager 132 at the video service provider 128 may be further configured to transmit a media stream (of the media content that is prepared) that comprises the programming media content and the non-programming media content to the client device 134, via the communication network 148. At least one of the plurality of digital watermarks or the plurality of digital fingerprints may be inserted at the plurality of event opportunities in the media content. The media stream may be generated by encapsulation of the prepared media content (inserted with trigger identifiers) in a transport stream based on a digital streaming protocol or a real time streaming protocol (RTSP)). Examples of the digital streaming protocol may include, but are not limited to, HTTP Live Streaming (HLS), Adaptive Bitrate Streaming (ABR), MPEG-DASH, Smooth Streaming, and HTTP Dynamic Streaming (HDS).

At the client-end, the client device 134 may be configured to receive the media stream of the prepared media content, via the communication network 148. In some embodiments, instead of the client device 134, a proxy server may receive the media stream of the prepared media content and further transmit the same media stream to the client device 134, via the communication network 148. Upon reception, the client device 134 may execute playback operations (e.g., decoding media content, rendering user interface, loading non-graphical and graphical elements, initializing player, displaying decoded media content on a player window, etc.) for the programming media content on the display 138 associated with the client device 134.

The plurality of trigger identifiers may be associated with the media content (e.g., provided in the client manifest or embedded in the media stream that includes the programming and/or the non-programming content) that is streamed at the client device 134. In some cases, digital watermarks (e.g., audio or video watermarks generated by the watermarking system 122) may be present/inserted at different candidate points (or event opportunities in the media content. Also, in other cases, digital fingerprints (audio or video fingerprints generated by the fingerprinting system 120) may be present/inserted in the media content. Therefore, in certain embodiments, the client device 134 may be configured to decide whether there is a requirement of fingerprint detection or watermark detection. In cases where there is a requirement of fingerprint detection and/or watermark detection, the client device 134 may be configured to detect at least one of the inserted digital watermarks or the digital fingerprints (of different segments or scenes, which may render an event opportunity) in the media content (programming or non-programming). Such decision to detect at least one of the inserted digital watermarks or the digital fingerprints may be further instructed by the interactive service provider 110 via a set of instructions (e.g., API-instructions) to the client device 134.

In some cases, the client application operational in the client device 134 (or applications) and responsible for playback of the media content may lack the capability to detect and recognize at least one of the inserted digital watermarks and the digital fingerprints in the media content. Therefore, in such cases, the client device 134 may be configured to request the content/watermark recognizer 140 to detect and recognize at least one of the inserted digital watermarks and the digital fingerprints in the media content, while the client application is playing the media content on the display 138.

The content/watermark recognizer 140 may detect at least one of the inserted digital watermarks or the digital fingerprints in the media content, through at least one of the client device 134 or the secondary device 136. For the detected digital watermarks and digital fingerprints, the content/watermark recognizer 140 may utilize the functionalities of the interactive service provider 110, to identify information (e.g., watermark information and fingerprint information, etc.) associated with the detected digital watermarks and/or digital fingerprints. Such information may include details of what to do, when the detection occurs, and where to request for information on the next action. For example, detection of a digital audio watermark may lead to determination of a watermark ID (255 bytes). The watermark ID may be insufficient for the client device 134 to execute an action, such as contacting the overlay ad server 144, retrieving the overlay graphics, presenting the retrieved overlay graphics, and activating the trigger inputs (input devices or overlay trigger inputs). Therefore, the content/watermark recognizer 140 may be configured to transmit a request to watermark/fingerprint registry 126 to determine at least one of the fingerprint information or the watermark information for detected digital fingerprints, and detected digital watermarks, respectively. In some cases, the request may be transmitted through instruction calls raised by a proxy server on behalf of the client device 134.

The watermark/fingerprint registry 126 may be configured to receive the request from the content/watermark recognizer 140 and in response to the received request, the watermark/fingerprint registry 126 may be configured to search for at least one of fingerprint information or the watermark information (whichever is requested) for detected digital fingerprints and detected digital watermarks, respectively. The watermark/fingerprint registry 126 may be further configured to communicate the fingerprint information and the watermark information back to the client device 134, for detected digital fingerprints and detected digital watermarks, respectively.

In other cases where there is a requirement of trigger identifier detection instead of fingerprint detection or watermark detection, the client device 134 may be configured to detect one or more of the inserted plurality of trigger identifiers in the playback duration of media content (programming or non-programming). Such decision to detect one or more trigger identifiers of the inserted plurality of trigger identifiers may be further instructed by one of the interactive service provider 110. Such instruction may be made to exercise an improved control of interactivity (e.g., presentation of different overlays, trigger options, and letting the user engage better with a presented opportunity) at the client device 134. The detection of a trigger identifier may lead to determination of an event ID (255 bytes). The event ID may be insufficient for the client device 134 to execute an action, such as contacting the overlay ad server 144, retrieving the overlay graphics, presenting the retrieved overlay graphics, and activating the trigger inputs (input devices or overlay trigger inputs). Therefore, the client device 134 may be further configured to transmit a request to the trigger registry in the interactive service provider 128 to determine event information for one or more detected trigger identifiers. In response to the request, the trigger registry (of the interactive service provider 110) may be configured to search for event information for the one or more detected trigger identifiers in the triggers registry and communicate the event information to the client device 134 for the one or more detected trigger identifiers.

In some cases, the client device 134 may be configured to receive the communicated fingerprint information or the watermark information from the watermark/fingerprint registry 126. In other cases, the client device 134 may be configured to receive the event information for the one or more detected trigger identifiers. The fingerprint information, the watermark information, or the event information may include instructions (or other metadata) that may specify at least an address (e.g., IP address) of the overlay ad server 144, an asset identifier (ID) of an overlay graphic that has to be presented at the event opportunity, permission information, and the like. The permission information, for example, may be information to access data from the overlay ad server 144. For each event opportunity, the client device 134 may seek permissions to present an overlay graphic on the display 138, from at least one of the video service provider 128 or the interactive service provider 110 (e.g., the graphic overlay manager 124 at the interactive service provider 110).

In response to permission requests, the client device 134 may receive, from the graphic overlay manager 124, decisions regarding whether to present an overlay graphic on the display 138 for a detected event opportunity (specified by a watermark, a fingerprint, or a trigger identifier). In some embodiments, the decision regarding whether to act upon the event opportunity may be taken based on a defined criteria. The defined criteria may include, but is not limited to a retrieved set of user-preferences, a defined goal in a flight (defined by the advertisers), a measured or known user attention span, time constraints, inventory constraints, user-defined constraints, and a combination thereof.

For example, the defined goal may include, but not limited to a defined value of cost per thousand impressions (CPM), a click through rate (CTR), cost per sale (CPS), and a reach target. Similarly, the time constraints may include, but are not limited to a limited duration for which the user may stay online and stream the programming media content, a limit to a total number of candidate time intervals (event opportunities) in the programming media content, and an average attention span of the user. The limit on user availability for the duration of programming media content may also set a limit on the number of candidate time intervals in a limited duration of the programming media content. The inventory constraints may include, but are not limited to an availability of overlay graphics that can be presented in the identified candidate time interval and a limit on a number of overlay graphics that matches up to the parameters in the request information. The user-defined constraints may include but are not limited to a constraint on number of advertisements, a cap on number of times a product advertised may be rendered purchasable, a content filter for a specific viewer (for example, filter content that is not intended for young kids and teenagers (below the age of 18 years).

The client device 134 may be further configured to transmit a request to the overlay ad server 144, to transmit overlay graphics for the event opportunities for which the permissions to present overlay graphics (and deliver services) have been granted by the video service provider 128 or the graphic overlay manager 124. The overlay ad server 144 may be configured to receive the request from the client device 134 and in response to the received request, the overlay ad server 144 may transmit overlay graphics (along with graphic metadata) to the client device 134. More specifically, the overlay ad server 144 may receive asset ID (or trigger ID and event ID) for each event opportunity for which permission to overlay graphics and render different services has been granted. The overlay ad server 144 may be further configured to search for overlay graphics that may match the asset ID (or trigger ID and event ID). In some cases, the overlay ad server 144 (or the graphic overlay manager 124 at the interactive service provider 110) may also specify (in the graphic metadata) different types of services that can be delivered through each overlay graphic, via the client device 134.

On receipt of the overlay graphics, the client device 134 may be configured to render a plurality of overlay graphics on the media content (programming and non-programming) for a plurality of candidate time intervals (corresponding to a plurality of event opportunities) within the playback duration of the media content. The plurality of overlay graphics may be rendered as a transparent layer placed on top (or sandwiched between different graphical layers) of the media content. An overlay graphic rendered on the media content may act as a trigger input, or more specifically, a user-selectable option when activated at the client device 134. However, in some cases, initially, the overlay graphic rendered on the media content may be presented in a deactivated state. The overlay graphic may be a specific bug (i.e., a digital on-screen graphic) for a product that is promoted in a non-programming asset played at the client device 134, a graphical button, a product mark, and the like.

In some embodiments, the overlay graphics may be rendered on an interactive view (i.e. an interactive platform or an interactive viewable region) of a client application in the secondary device 136. A notification may be served on the secondary device 136 and upon user selection of the served notification, the client application may pop up on the display screen of the secondary device 136 and an overlay graphic (e.g., an on-screen user-selectable button) may be displayed in the client application interface. The decision to present an overlay graphic on the secondary device 136 may be taken by the interactive service provider 110, or the client device 134, based on usage statistics of the secondary device 136 and user accessibility to engage with the overlay graphic (if activated) on the secondary device 136.

The client device 134 may be further configured to search (or identify) for available set of input devices (wired or wireless) that may be present in the vicinity of the client device 134 or the secondary device 136 paired with the client device 134. Example of an input device may include, but not limited to, a TV remote, a smartphone, a haptic switch, a gesture sensor, a motion sensor, a smart speaker, a paired (or connectable) microphone, or a specialized physical input device (e.g., a button that is common for every product, or a product-specific button). Thereafter, the client device 134 may be further configured to pair up with the one or more of the set of input devices available in vicinity of the client device 134 or the secondary device 136. The client device 134 may pair up with one or more of the set of input devices, via a Bluetooth network, a Wi-Fi network, an internet-based network, a wired local network, an ad hoc network, and the like. In some cases, instead of pairing up, an input device (e.g., a smart speaker) may listen to audio (or visual) markers/beacons/signals during the playback of the media content, and therefore, may not require pairing connections with the client device 134. A check may be further executed by the client device 134 to decide whether to activate one or more input devices (paired/unpaired with the client device 134) from the set of input devices, the overlay graphics rendered on the media content or the overlay graphics rendered at the secondary device 136.

The decision for activation may be taken based on the check executed on a defined criteria that is associated with records of previous service requests for event opportunities already on which services were delivered in past. The defined criteria may include at least one of a user-defined constraint, an inventory constraint, and a specified threshold count of trigger responses for a product offering or a service offering promoted by the non-programming media content. For example, the criteria may include that don't activate the input devices (paired/unpaired with the client device 134) for "x" product if the customer has already purchased "x" product yesterday. In some cases, the decisions may be taken to minimize an effect of disturbance or diversions in viewing experience for a user who may wish to watch the programming media content without any diversions caused by promotional content (or user selectable options).

The client device 134 may be further configured to activate at least one of one or more input devices in vicinity of the client device 134 or the rendered plurality of overlay graphics. At least one of the one or more input devices may be paired with the client device 134 or the secondary device 136. The activation may be done based on the decisions (based on the defined criteria) taken by the interactive service provider 110. The activation may be followed by a notification (e.g., a notification light that blinks on the TV remote when the TV remote is activated to send a trigger response, a vibration pattern, a tone with a specific pattern, an on-screen visual notification, etc.) to alert the user associated with the client device 134 regarding the activation of an input device, or a rendered overlay graphic. The overlay graphic that is rendered on the display 138 may specify types of services that the user can avail if selected through the activated input device(s) or overlay graphics. The types of services may include, but are not limited to one of a direct payment, a direct transaction, or a direct notification for a product offering or a service offering, and a direct update of a selected product offering or a service offering in a shopping cart, a personalized list generation, or sharing on a social platform. Different services that may be delivered through the client device 134 or the secondary device 136, may be an OTT service through internet, a service that can be delivered through broadcast networks on different client devices, such as ATSC smart TVs (e.g., ATSC 3-enabled TV), presentable (visual, aural, etc.) services, consumable services, online services, purchase service, or other access independent services or dependent services.

In some cases, the client device 134 may be configured to receive one or more trigger responses over an activated overlay graphic on the media content (during playback duration of the media content), via an activated input device or an overlay trigger input (also referred to as an activated overlay graphic). The one or more trigger responses may correspond to one or more user interactions that are received based on at least one of, but not limited to, a touch input, a gesture input, a haptic input and a voice command input. One or more notifications may be received on at least one of the client device 134 or the secondary device 136 paired with the client device 134, in response to the received one or more trigger responses. Also, more notifications may be delivered when an overlay graphic or an input device is not enabled based on the defined criteria, or when service is selected delivery, and the like. The one or more notifications may be delivered by the fulfillment server 146 based on instructions of the interactive service provider 110. Alternatively stated, the interactive service provider 110 may be configured to instruct a delivery of the one or more notifications on at least one of the client device 134 or the secondary device 136 paired with the client device 134, in response to the received one or more trigger responses at the client device 134.

In response to a receipt of the one or more trigger responses, the client device 134 may be further configured to transmit a request to the fulfillment server 146 to deliver specific services. Different services that may be delivered through the client device 134 may be an (over-the-top) OTT service through internet, a service that can be delivered through broadcast networks on different client devices, such as ATSC smart TVs (e.g., ATSC 3-enabled TV), presentable (visual, aural, etc.) services, consumable services, online services, purchase service, or other access independent services or dependent services. Also, different client devices (e.g., the client device 134), through which different services may be delivered, may be an ATSC smart TV capable of reading watermarks for a broadcast implementation, a set top box, an internet-based television, a smartphone, a tablet, and the like.

The fulfillment server 146 may be configured to receive the request from the client device 134 for delivery of services (or service offerings) that were promoted by the non-programming media content at the client device 134. The fulfillment server 146 may deliver the services in response to the received one or more trigger responses on the event opportunities in the programming media content.

The client device 134 may be further configured to display an interactive view (or an interactive platform, e.g., a payment page or an e-commerce web page, etc.) on the client device 134, to enable delivery of the services in response to the received one or more trigger responses. The delivery of the services may be enabled at the client device 134 in communication with the fulfillment server 146 that fulfills the delivery of the services to increase a user engagement to select services. For example, the fulfillment server 146 may render a shopping cart with a product offering (promoted in the non-programming media content at an event opportunity) selected based on a trigger response. In some cases, instead of a shopping cart, a selected product offering may be directly ordered by the fulfillment server 146 based on pre-specified payment information and address information in the user database.

In an exemplary embodiment, a virtual voice assistant may be enabled on the input device, or at least one of the client device 134 or the secondary device 136. Also, the virtual voice assistant may be accessible through a voice command device (e.g., a smart speaker). The input device may be configured to actively wait and listen for a trigger identifier in the audio portion of the media content. The trigger identifier in the audio portion may be an inaudible beacon (ultrasonic or infrasonic frequency range), an audible beacon, and the like. The voice command device or the virtual assistant may detect beacons within the playback duration of the programming media content and facilitate a conversation with the user to receive a trigger response from the user. The trigger response may be received through a user's speech input. The voice command device or the virtual assistant may communicate the trigger response to the client device 134, which may further communicate the trigger response to the fulfillment server 146. The fulfillment sever 152 may be further configured to deliver services (offered with the playback of the media content) based on the received trigger response in the conversation between the user and the voice command device or the virtual assistant.

In certain embodiments, all the operations executed by the client device 134 except the playback of media content on the display 138 may be executed by a proxy server (not shown in FIG. 1) on behalf of the client device 134. Such execution may not affect the functional performance of the client device 134 or expected results from different operations described in FIG. 1, without a deviation from scope of the disclosure.

In an exemplary scenario, in operation, the video service provider 128 may be configured to deliver the media assets with non-interactive overlay graphics to the client device 134. The interactive service provider 110 may enable the interactivity at the client device 134 (or when the playback starts or when the event opportunity is detected during playback). More specifically, the interactive service provider 110 may retrieve an advertisement video from the ad agency 104. The interactive service provider 110 may be configured to embed a machine-readable optical label (e.g., a Quick Response (QR) code) in the retrieved advertisement video. The interactive service provider 110 may be configured to further register the machine-readable optical label in a database and return the modified advertisement video to the Ad Agency 104. The ad agency 104 may be configured to distribute the modified advertisement video to the video service provider 128. The video service provider 128 may, after receiving the modified advertisement video, play the advertisement video in the video stream.

At the client-end, the client device 134 may be utilized by a user to capture a picture of the machine-readable optical label with a machine-readable optical label reader, which may identify a link to the interactive service provider 110. The interactive service provider 110 may look up the machine-readable optical label in the watermark/fingerprint registry 126 and return an appropriate second screen interactivity on the client device 134.

In some embodiments, instead of using a machine-readable optical label, the interactive service provider 110 may use watermarks or fingerprints to render the same interactivity on the client device 134. The use of watermarks, fingerprints, or trigger identifiers may replace use of the machine-readable optical label and eliminate the need for the user to take a picture, and thereby automating the delivery of interactivity and different user-options based on which different services may be delivered. The video service provide 128 may insert other trigger identifier but may have no records for the trigger identifies that may have been inserted by the interactive service provider 110.

Figure 2:
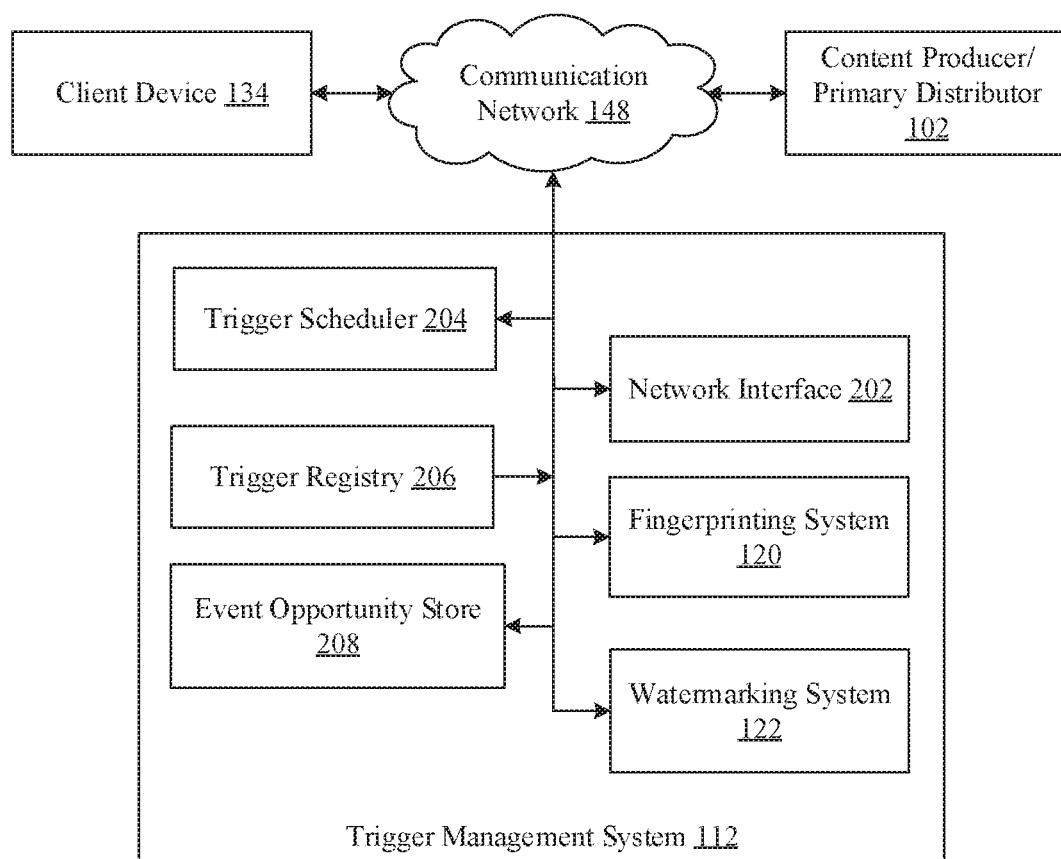
FIG. 2 is a block diagram that illustrates an exemplary trigger management system that handles insertion and activation of trigger identifiers in media content, in accordance with an exemplary embodiment of the disclosure.

FIG. 2 is a block diagram that illustrates an exemplary trigger management system that handles insertion and activation of trigger identifiers in media content, in accordance with an exemplary embodiment of the disclosure. FIG. 2 is explained in conjunction with elements from FIG. 1. With reference to FIG. 2, there is shown a block diagram 200 of the trigger management system 112. The trigger management system 112 may include a network interface 202, a trigger scheduler 204, a trigger registry 206, and an event opportunity store 208. The trigger management system 112 may also include the fingerprinting system 120 and the watermarking system 122, as shown in FIG. 1.

The trigger scheduler 204 may comprise suitable logic, circuitry, and interfaces that may be configured to generate a plurality of trigger identifiers (e.g., a trigger identifier may include "255 bytes" of information that includes at least an asset or event identifier (ID)). The trigger scheduler 204 may also generate event information for each generated trigger identifier. The event information may include, but not limited to, asset ID of a programming or a non-programming media asset, an overlay position of a programming or a non-programming media asset, a graphic asset that may be overlaid, an overlay duration, and/or other presentation attributes. The trigger scheduler 204 may be further configured to insert the generated plurality of trigger identifiers in media content (i.e., a combination of programming and/or received non-programming media content) at different event opportunities.

The trigger registry 206 may manage a database or a set of databases for event information for each generated trigger identifier by the trigger scheduler 204. The event information may be utilized to search for metadata and details of an event trigger that is detected at different client devices (e.g., the client device 134). The event trigger may correspond to an event opportunity, details of which may be specified in the event opportunity store 208.

The event opportunity store 208 may comprise suitable logic, circuitry, and interfaces that may be configured to store a scheduled list of event opportunities (represented by candidate time intervals or on-screen regions in candidate time intervals) in the media content (programming or non-programming). The scheduled list of event opportunities may be received from the media analysis system 116 based on an analysis of the media content received from the content producer/primary distributor 102.

Figure 3:
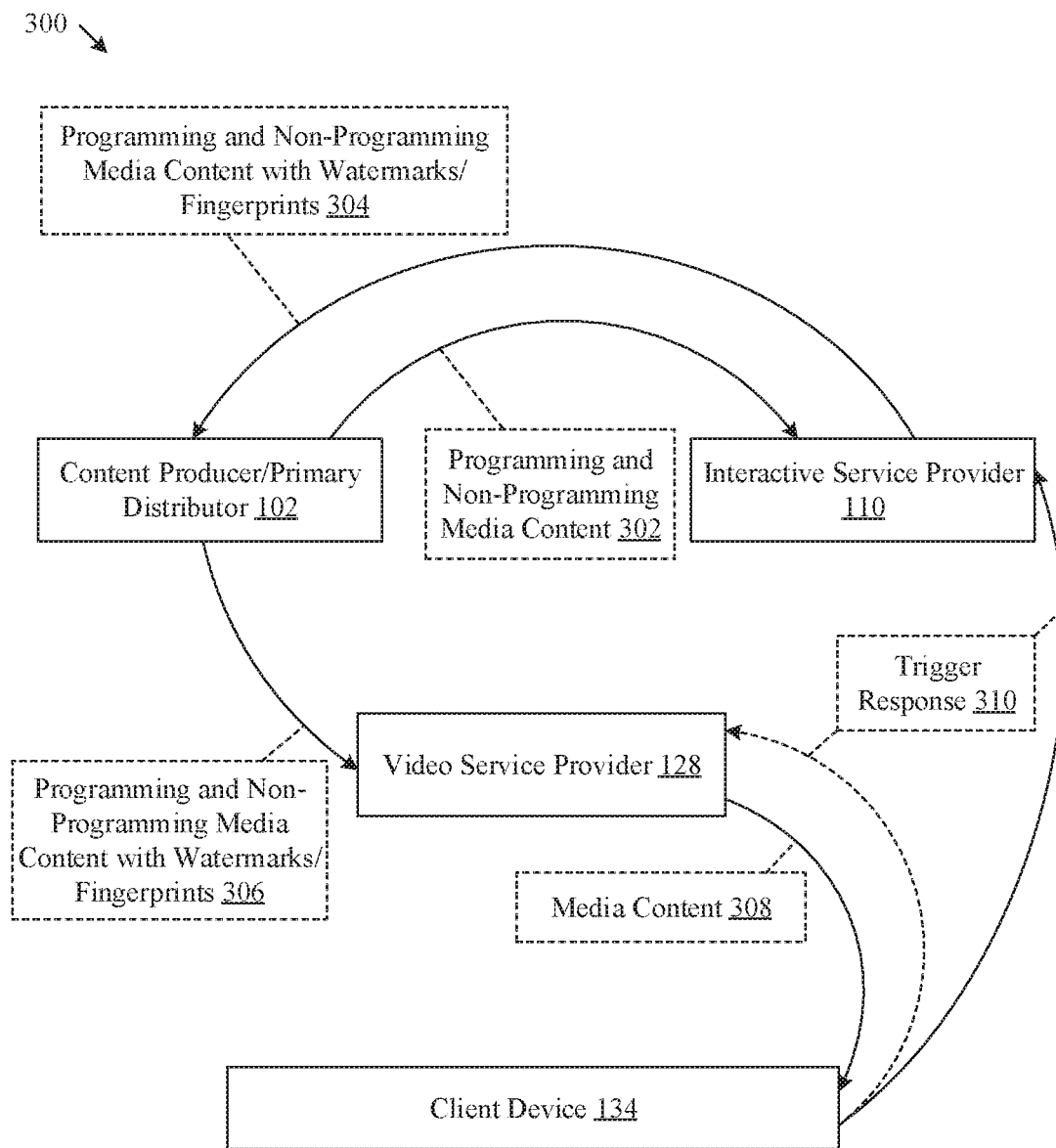
FIG. 3 is a flow diagram that illustrates data exchange among the exemplary video service provider of FIG. 2, an exemplary client device, an interactive service provider, and a content producer/primary distributor, in accordance with an embodiment of the disclosure.

FIG. 3 is a flow diagram that illustrates data exchange among the exemplary video service provider of FIG. 2, an exemplary media content streaming device, an interactive service provider, and a content producer/primary distributor, in accordance with an embodiment of the disclosure. FIG. 3 is explained in conjunction with elements from FIG. 1 and FIG. 2. With reference to FIG. 3, there is shown a flow diagram 300 that specifies a sequence of data exchange among the video service provider 128, the client device 134, the interactive service provider 110, and the content producer/primary distributor 102, and the client device 134, for delivery of different services through different client devices.

Initially, as the content producer/primary distributor 102 may have partnerships and established communication channels, with the interactive service provider 110 (e.g., a $3^{rd}$ party server), the content producer/primary distributor 102 may transmit programming and non-programming media content 302 to the interactive service provider 110, through the communication network 148. The programming and non-programming media content 302 may be transmitted for a third party media analysis, fingerprinting and digital watermarking of the programming and non-programming media content 302. Therefore, the interactive service provider 110 may be configured to transmit programming and non-programming media content with watermarks/fingerprints 304 back to the content producer/primary distributor 102.

As the video service provider 128 may have partnership (or a rules based, obligation based, or dedicated communication channel) with the content producer/primary distributor 102, the content producer/primary distributor 102 may be configured to transmit the programming and non-programming media content with watermarks/fingerprints 306 to the video service provider 128. The video service provider 128 may package the received programming and non-programming with watermarks/fingerprints 306 with other programming media content, to obtain media content 308. The video service provider 128 may also insert trigger identifiers in the media content 308 and then transmit the media content 308 to the client device 134, via the communication network 148. Thereafter, the client device 134 may be configured to execute the playback of the media content 308, detect trigger identifiers, and further serve different user-selectable options (via overlay graphics or input devices paired/unpaired with the client device 134) to request different services for product offerings/service offerings promoted with the playback of the media content 308. A trigger response 310 may be further generated at the client device 134 in response to the user-engagement with served user-selectable options. The client device 134 may be further configured to transmit the trigger response 310 to at least one of video service provider 128 or the interactive service provider 110 (regarding further decisioning on what to do over the trigger response 310). In response to the receipt of the trigger response 310, the interactive service provider 110 may instruct the fulfillment server 146 to deliver a service (specified in the trigger response) though the client device 134 to the user. The fulfilment server 146 may be configured to execute different tasks (e.g., payment, ordering, notifications, etc.) to deliver the requested service through the client device 134.

Different services that may be delivered through the client device 134 may be an (over-the-top) OTT service through internet, a service that can be delivered through broadcast networks on different client devices, such as ATSC smart TVs (e.g., ATSC 3-enabled TV), presentable (visual, aural, etc.) services, consumable services, online services, purchase service, or other access independent services or dependent services. Also, different client devices (e.g., the client device 134), through which different services may be delivered, may be an ATSC smart TV capable of reading watermarks for a broadcast implementation, a set top box, an internet-based television, a smartphone, a tablet, and the like.

Figure 4A:
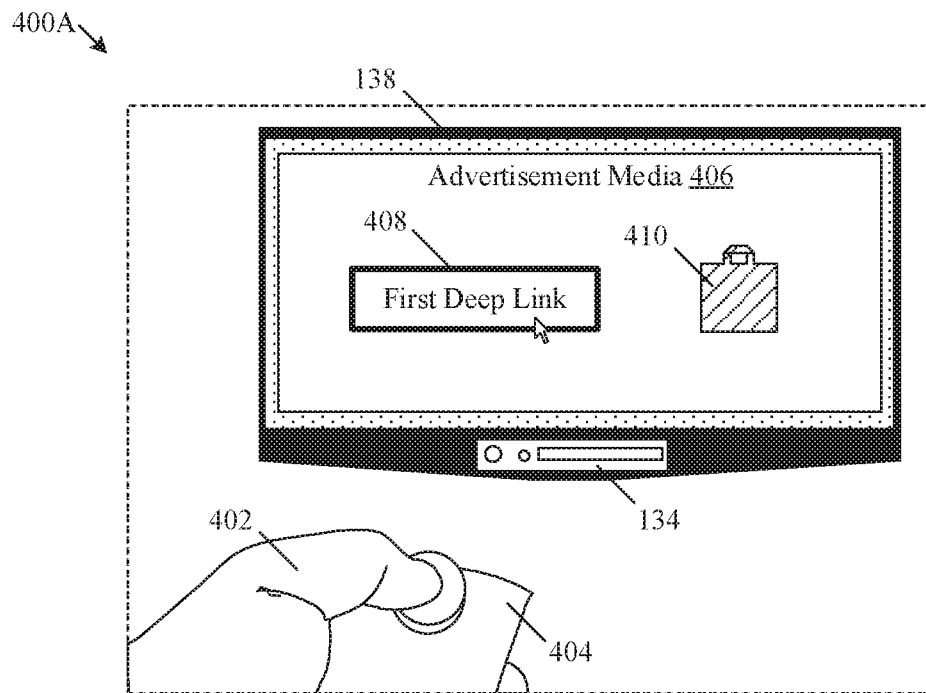
FIGS. 4A and 4B, collectively depict that illustrates a client-side presentation of a deep linked overlay graphic and receipt of trigger response over presented deep linked overlay graphic, via an input device, in accordance with an embodiment of the disclosure.
Figure 4B:
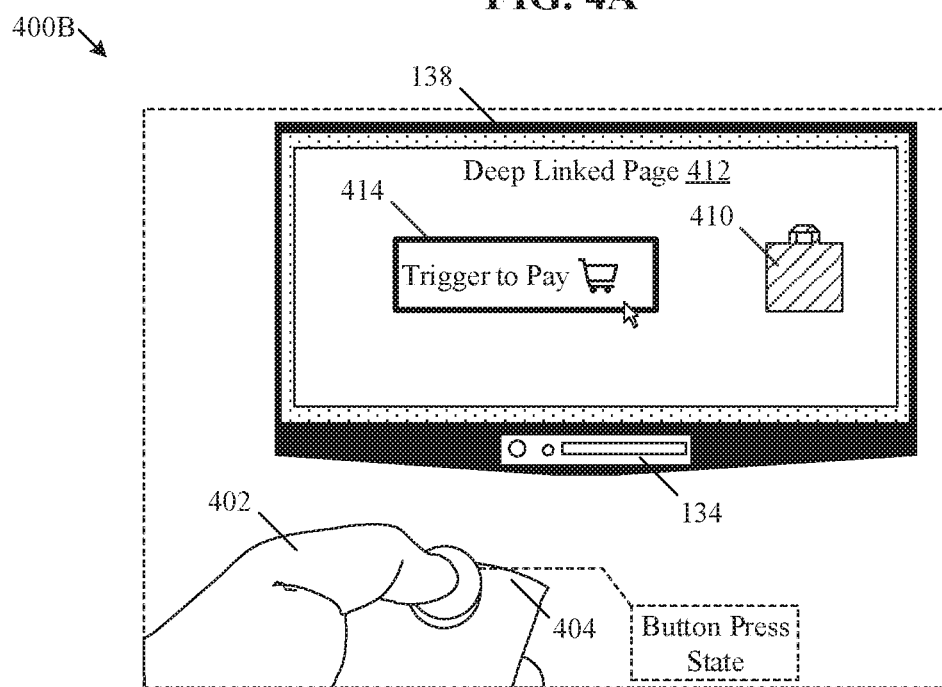

FIGS. 4A and 4B, collectively depict a first exemplary scenario that illustrates a client-side presentation of a deep linked overlay graphic and receipt of trigger response over presented deep linked overlay graphic, via an input device, in accordance with an embodiment of the disclosure. FIGS. 4A and 4B are explained in conjunction with elements from FIG. 1 and FIG. 2. With reference to FIGS. 4A and 4B, there is shown a first exemplary scenario that shows two different states at different time instants (i.e., a first state 400A and a second state 400B) in which a purchase service is rendered based on a deep link that is activated while media content is streamed and played on the display 138.

In the first state 400A of FIG. 4A, a user 402 may be engaged in watching programming media content (e.g., a favorite TV show) on a television channel. An input device 404 that is paired with the client device 134 may be held in the hand of the user 402. While an advertisement media 406 is played on the channel, the client device 134 may present a link 408 (represented as a "First Deep Link" in the FIG. 4A) and activate the input device 404 to purchase a product offering 410 promoted in the advertisement media 406 presented on the display 138.

In second state 400B of FIG. 4B that occurs after the first state 400A of FIG. 4A, upon activation of the input device 404, a notification may be presented to the user 402 (via one of the input device 404, the client device 134, or other devices that may be paired/unpaired with the client device 134). Such notification may alert the user 402 to act within a specified duration for which the input device 404 is activated. In an event where the button on the input device 404 is pressed (or selected), the fulfillment server 146 may receive a trigger response (which may include details of the selected product offering 410 and user details (e.g., payment details, delivery address, etc.)). Upon receipt of the trigger response, the fulfillment server 146 may generate a deep linked page 412 (i.e., an interactive view) that may be displayed on the display 138. The deep linked page 412 may show the selected product offering 410 and a user-selectable option 414 (that reads "Trigger to pay") may pop up. The deep linked page 412 may be controlled by the interactive service provider 110. Upon selection of the user-selectable option 414, the displayed product offering 410 may be transferred to a shopping cart 416 and a confirmation message may pop up on the display 138. Upon confirmation, the fulfillment server 146 may be configured to complete a transaction and the selected product offering 410 may be ordered for delivery.

Figure 5B:
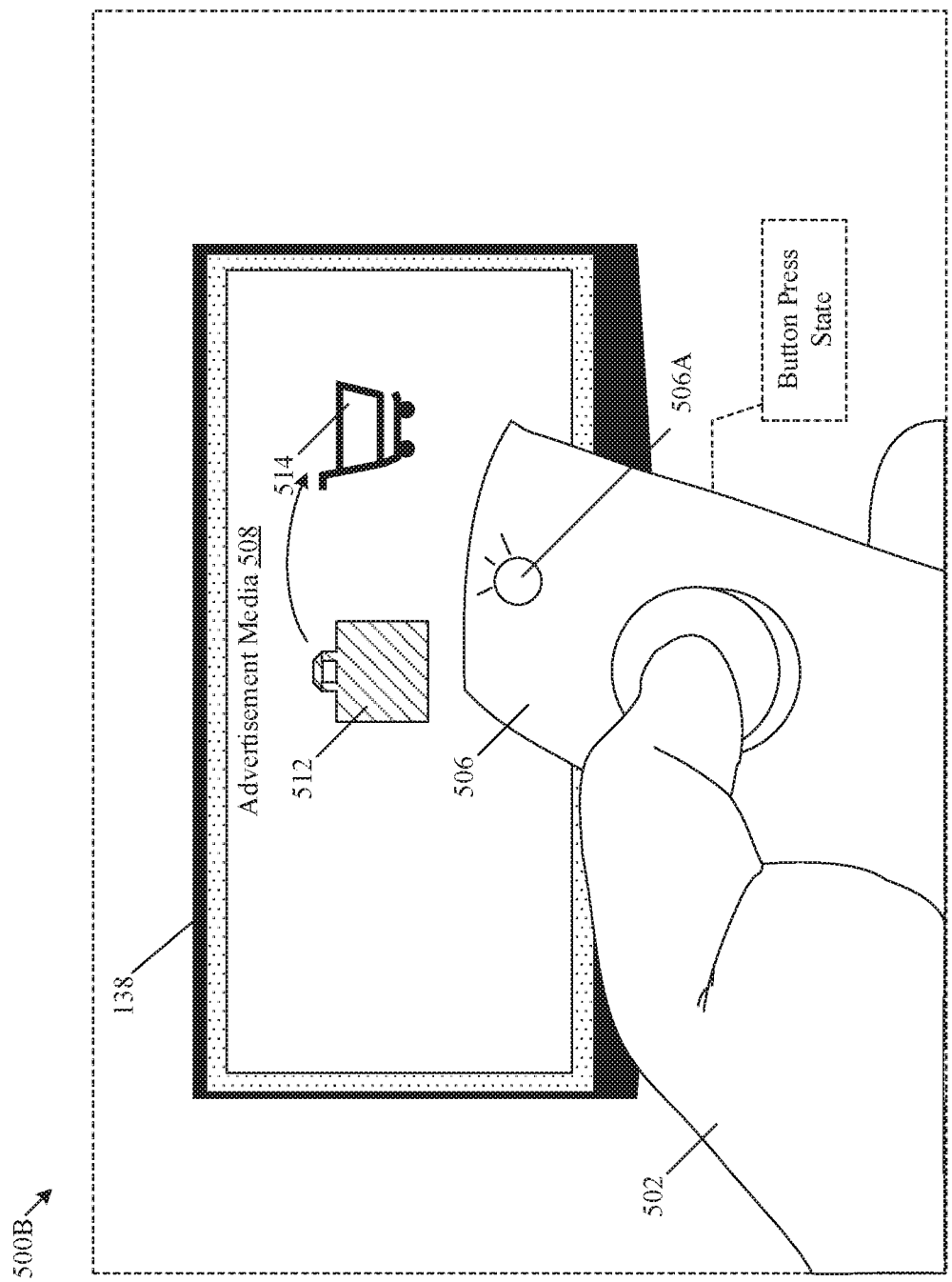

FIGS. 5A and 5B, collectively depict a second exemplary scenario that illustrates a client-side presentation of overlay graphics and receipt of trigger response over presented overlay graphics, via an input device, in accordance with an embodiment of the disclosure. FIGS. 5A and 5B are explained in conjunction with elements from FIGS. 1, 2, 3, 4A, and 4B. With reference to FIGS. 5A and 5B, there is shown a second exemplary scenario that shows two different states at different time instants (i.e., a first state 500A and a second state 500B) in which a purchase service is rendered based on user-options activated while non-programming media content is streamed and played on the display 138.

In the first state 500A of FIG. 5A, a user 502 may be engaged in watching programming media content (e.g., a favorite TV show) on a television channel (represented by a channel logo 504). An input device 506 that is paired with the client device 134 may be held in the hand of the user 502. While an advertisement media 508 is played on the channel (represented by the channel logo 504), the client device 134 may present an overlay graphic 510 (represented as a "buy option" in the FIG. 5A) and activate the input device 506 to purchase a product offering 512 promoted in the advertisement media 508 presented on the display 138.

In second state 500B of FIG. 5B that occurs after the first state 500A of FIG. 5A, upon activation of the input device 506, a notification light 506A on the input device 506 may blink in accordance with a specific pattern. Such blinking may alert the user 502 to act within a defined duration for which the input device 506 is activated. In an event where the button on the input device 506 is pressed (or selected), the fulfillment server 146 may receive a trigger response (which may include details of the selected product offering 512 and user details (e.g., payment details, delivery address, etc.)). Upon receipt of the trigger response, the fulfillment server 146 may generate an interactive view (i.e., an interactive platform or page) that may be displayed on the display 138. The interactive view may show the selected product offering 512 getting transferred to shopping cart 514 and a confirmation message may pop up on the display 138. Upon confirmation, the fulfillment server 146 may be configured to complete a transaction and the selected product offering 512 may be ordered for delivery. Thus, an advanced system is provided that transforms a transient attention to selective sustained attention for viewed promotional content (e.g. the advertisement media 508 played on the channel) and enables the selected product offering 512, to be purchased, without moving away from the channel (represented by the channel logo 504.

Figure 6:
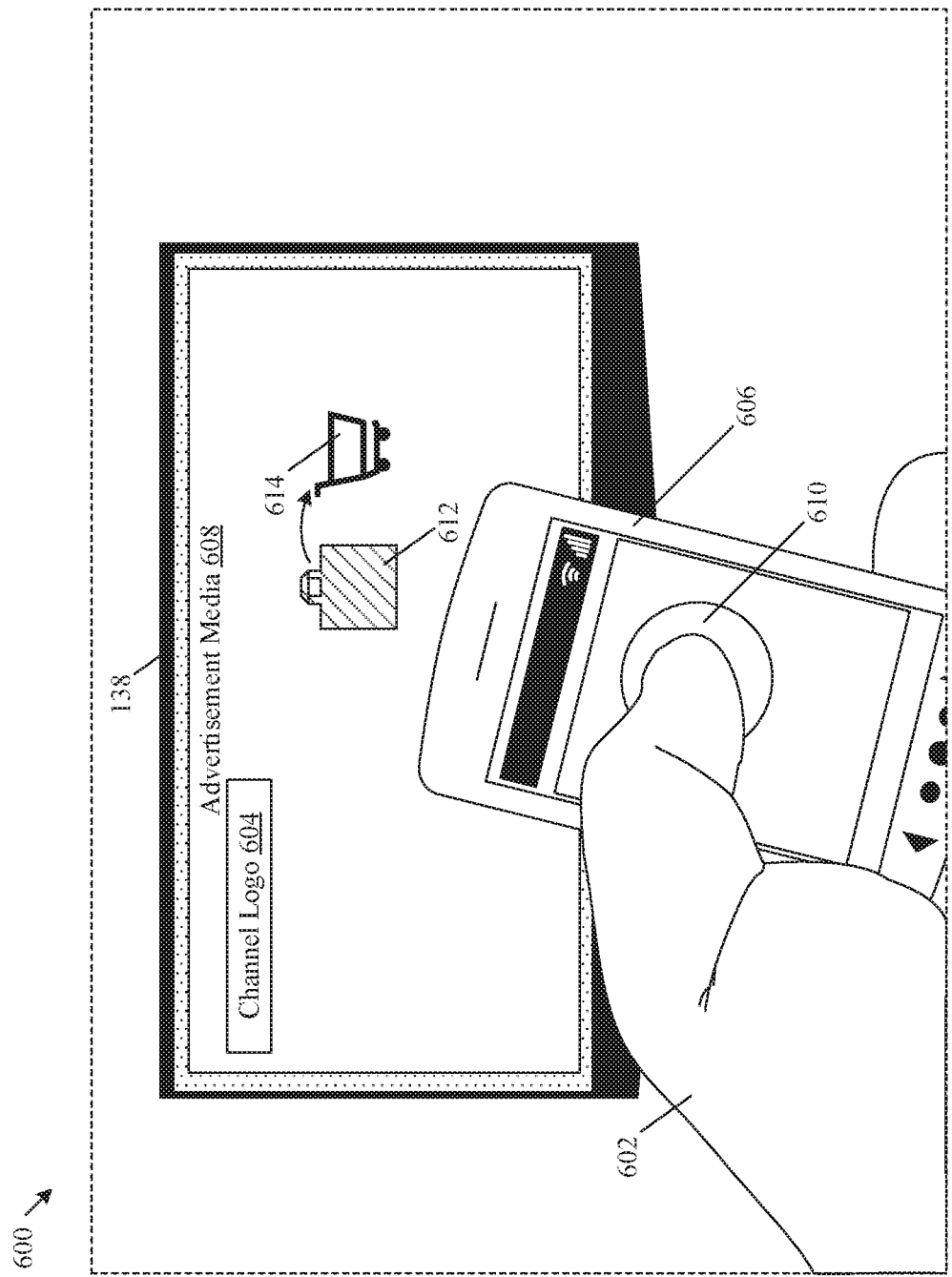
FIG. 6 depicts a third exemplary scenario that illustrates client-side presentation of overlay graphics and receipt of trigger response over presented overlay graphics, via a trigger input rendered on a secondary device paired with client device, in accordance with an embodiment of the disclosure.

FIG. 6 depicts a third exemplary scenario that illustrates client-side presentation of overlay graphics and receipt of trigger response over presented overlay graphics, via a trigger input rendered on a secondary device paired with client device, in accordance with an embodiment of the disclosure. FIG. 6 is explained in conjunction with elements from FIGS. 1, 2, 3, 4A, 4B, 5A, and 5B. With reference to FIG. 6, there is shown a third exemplary scenario that shows a state 600 in which a purchase service is rendered based on user-options activated while non-programming media content is streamed and played on the display 138.

In the state 600, a user 602 may be engaged in watching programming media content (e.g., favorite TV show) on a television channel (represented by a channel logo 604), and the non-programming media content may then be played at the client device 134. A smartphone 606 (i.e., the secondary device 136) that is paired with the client device 134 may be held in the hand of the user 602. While he non-programming media content, such as an advertisement media 608, is played on the channel (represented by the channel logo 604), an overlay graphic 610 (which is represented by a "graphical button") is rendered on the display of the smartphone 606. The smartphone 606 is further activated to purchase a product offering 612 promoted in the advertisement media 608 and presented on the display 138.

Upon activation, the smartphone 606 may respond by generating a notification (e.g., a vibration, a light blink, screen blink, a tone, etc.). Such notifications may alert the user 602 to act within a specified duration for which the smartphone 606 is activated. In an event where the overlay graphic 610 on the smartphone 606 is pressed (or selected), the fulfillment server 146 may receive a trigger response (which may include details of the selected product offering 612 and user details (e.g., payment details, delivery address, etc.)). Upon receipt of the trigger response, the fulfillment server 146 may generate an interactive view (i.e., an interactive platform or interactive page) that may be displayed on the display 138. The interactive view may show the selected product offering 612 getting transferred to shopping cart 614 and a confirmation message may pop up on the display 138.

Upon confirmation, the fulfillment server 146 may be configured to complete a transaction and the selected product offering 612 may be ordered for delivery.

Figure 7:
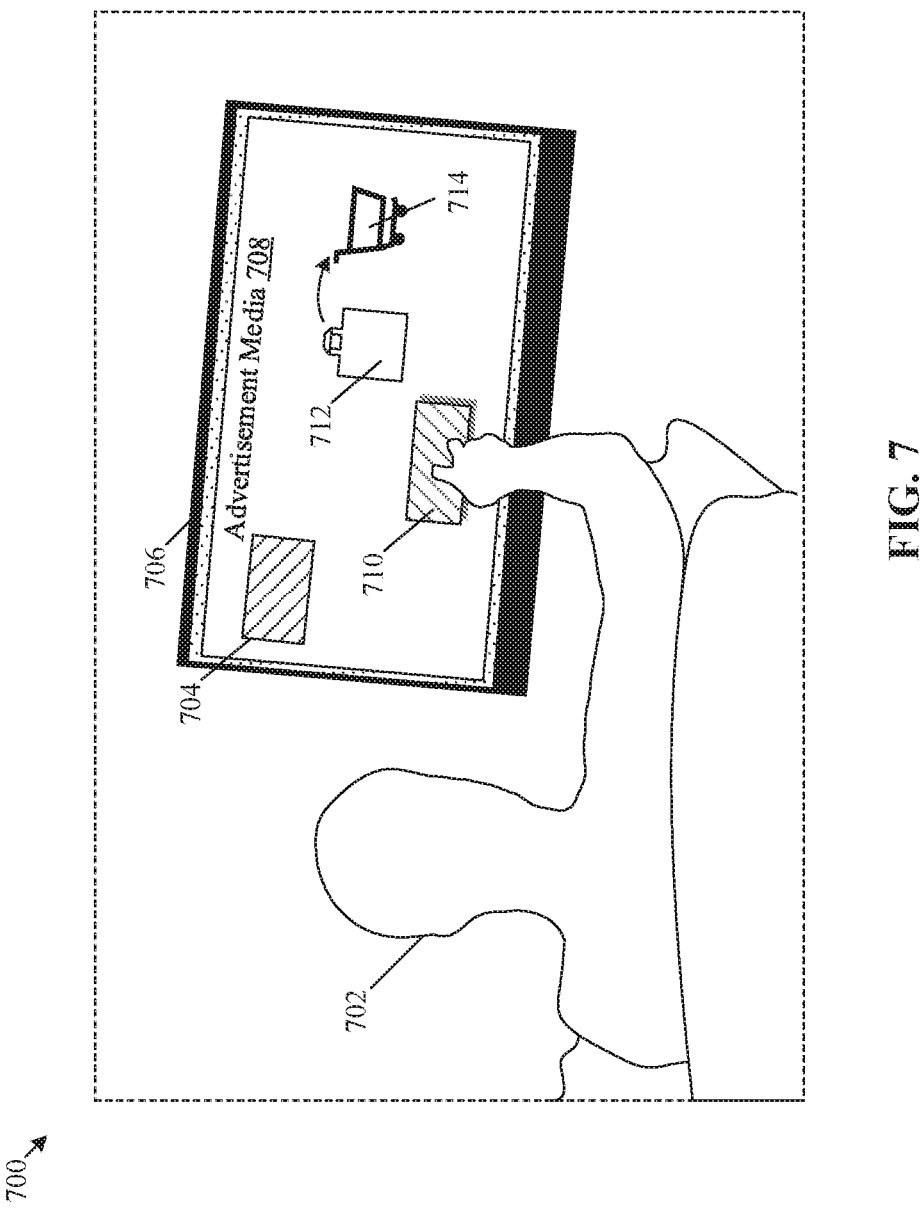
FIG. 7 depicts a fourth exemplary scenario that illustrates client-side presentation of overlay graphics and receipt of trigger response over presented overlay graphics based on a direct user selection of presented overlay graphics, via a touch input, in accordance with an embodiment of the disclosure.
Figure 9A:
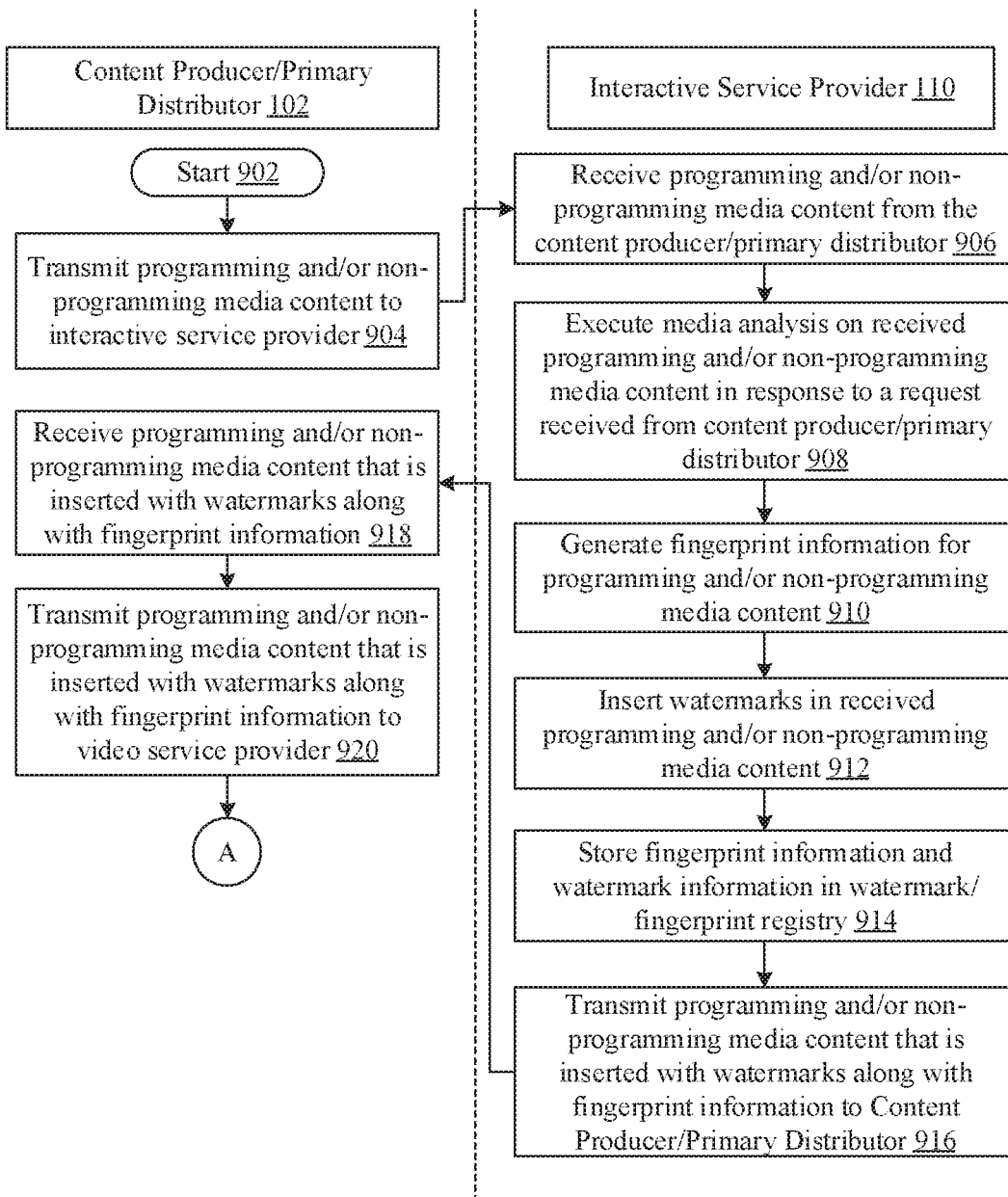
FIGS. 9A, 9B, 9C, 9D, and 9E are flowcharts that collectively illustrate a method for delivery of different services through different client devices, in accordance with an embodiment of the disclosure.
Figure 9B:
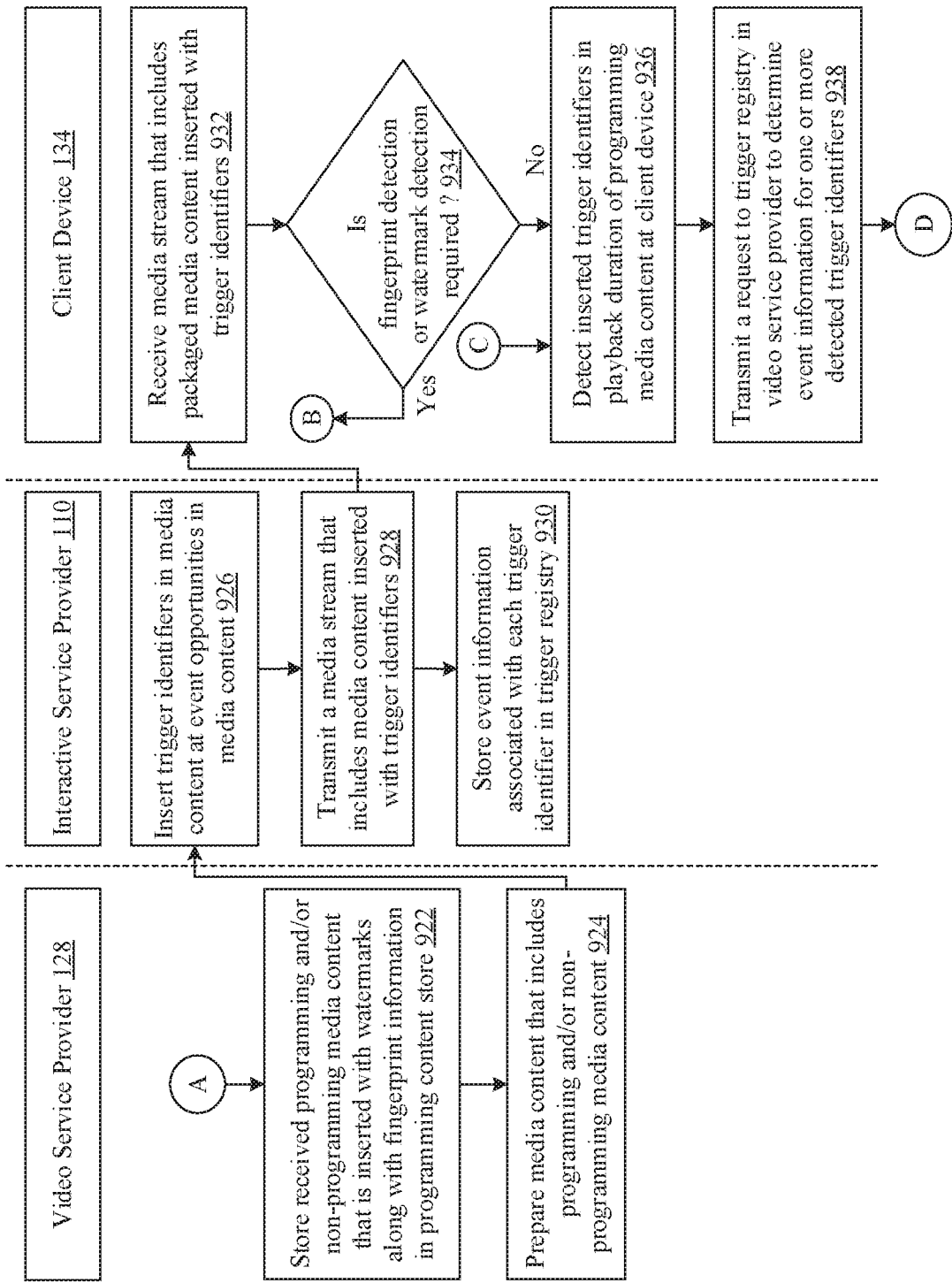
Figure 9C:
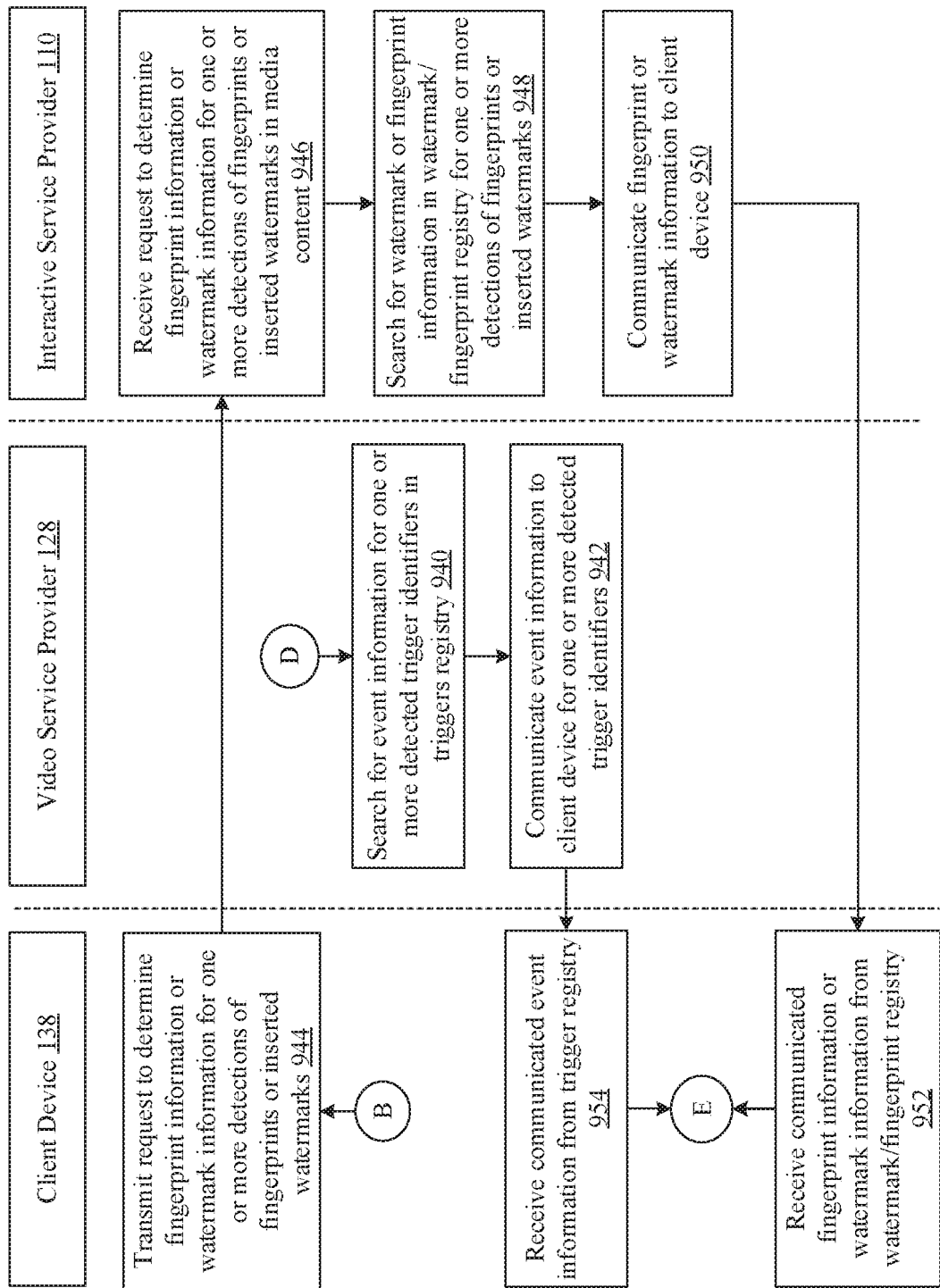
Figure 9D:
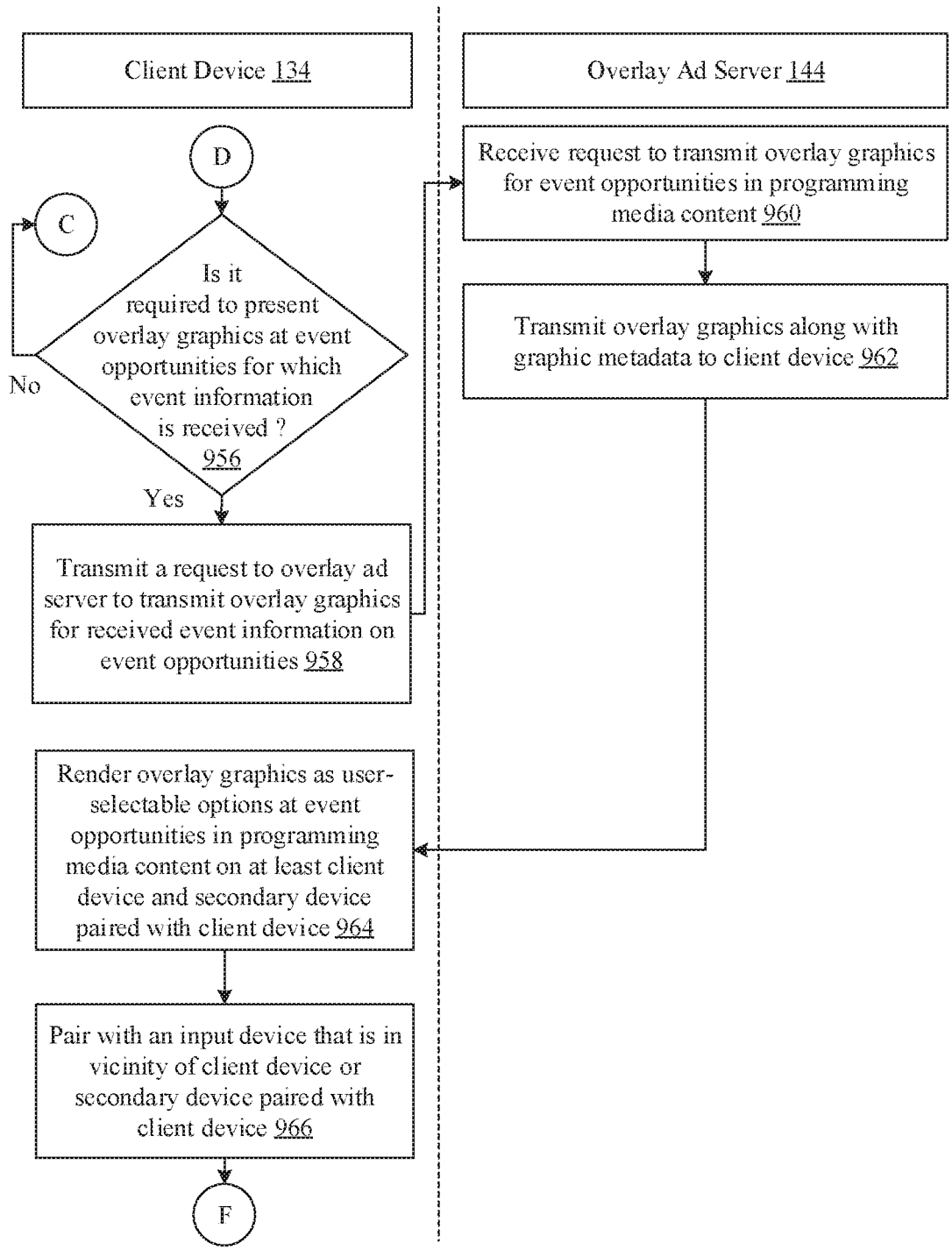
Figure 9E:
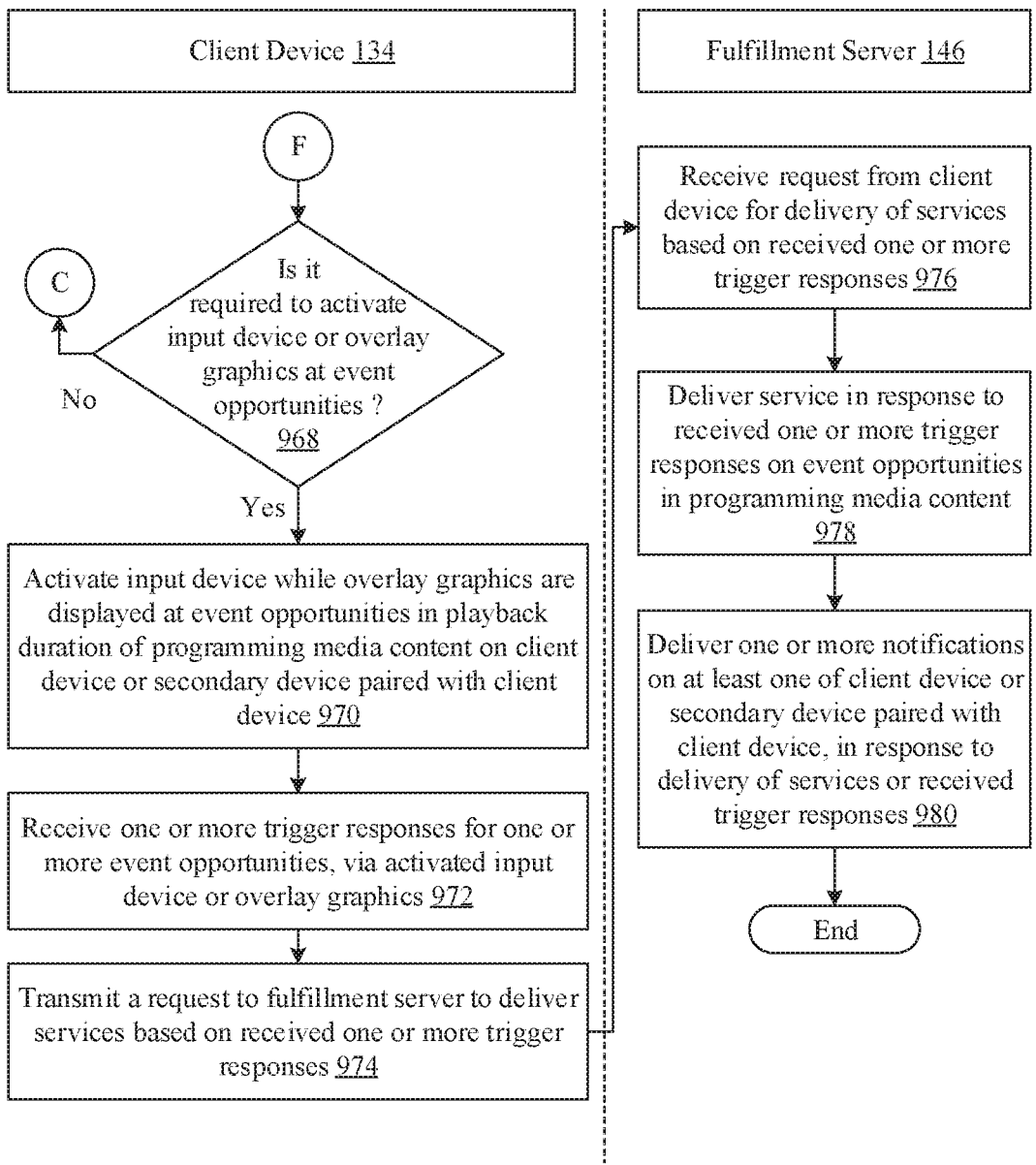

FIG. 7 depicts a fourth exemplary scenario that illustrates client-side presentation of overlay graphics and receipt of trigger response over presented overlay graphics based on a direct user selection of presented overlay graphics, in accordance with an embodiment of the disclosure. FIG. 7 is explained in conjunction with elements from FIGS. 1, 2, 3, 4A, 4B, 5A, 5B, and 6. With reference to FIG. 7, there is shown a third exemplary scenario that shows a state 700 in which a purchase service is rendered based on user-options activated while non-programming media content is streamed and played on a touch screen device.

In the state 700, a user 702 may be engaged in watching programming media content (e.g., favorite TV show) on a television channel (represented by a channel logo 704). A tablet 706 (i.e., an integration of the client device 134 and the display 138) may be held in the hand of the user 702. While an advertisement media 708 is played on the channel (represented by the channel logo 704) at a certain point of the programming media content, an overlay graphic 710 (which is represented by a "graphical button") may be rendered on the touch display of the tablet 706. Thereafter, the tablet 706 may be activated to purchase a product offering 712 promoted in the advertisement media 708.

Upon activation, the tablet 706 may respond by generating a notification (e.g., a vibration, a light blink, screen blink, a tone, etc.). Such notifications may alert the user 702 to act within a specified duration for which the tablet 706 is activated. In an event where the overlay graphic 710 is selected by a touch input on the touch screen of the tablet 706, the fulfillment server 146 may receive a trigger response (which may include details of the selected product offering 712 and user details (e.g., payment details, delivery address, etc.)). Upon receipt of the trigger response, the fulfillment server 146 may generate an interactive view (i.e., an interactive platform, page, or UI) that may be displayed on the tablet 706. The page may show the selected product offering 712 getting transferred to shopping cart 714 and a confirmation message may pop up on the tablet 706. Upon confirmation, the fulfillment server 146 may be configured to complete a transaction and the selected product offering 712 may be ordered for delivery.

FIG. 8 depicts a fifth exemplary scenario that illustrates client-side presentation of overlay graphics and receipt of voice responses over presented overlay graphics, handled by a smart conversational agent, in accordance with an embodiment of the disclosure. FIG. 8 is explained in conjunction with elements from FIGS. 1, 2, 3, 4A, 4B, 5A, 5B, 6, and 7. With reference to FIG. 8, there is shown a fifth exemplary scenario 800 in which a purchase service is rendered based on activation of a smart conversational agent while programming or non-programming media content is streamed and played on the display 138.

Initially, a user 802 may be engaged in watching programming media content (e.g., favorite TV show) on a television channel (represented by a channel logo 804). A smart speaker 806 that includes (or is accessible to) a virtual voice assistant may be paired with the client device 134. In some cases, the smart speaker 806 may be unpaired and the virtual voice assistant for the smart speaker may be directly configured by the interactive service provider 110, without communication of such configuration to the client device 134. Also, instead of the smart speaker 806, the virtual voice assistant may be active on the secondary device 136. Both the smart speaker and/or the virtual voice assistant may be present in an audible range in the vicinity of the client device 134. The interactive service provider 110 may manage the operations of the smart speaker 806, which may actively wait and listen for a trigger identifier (e.g., an inaudible beacon) in the audio portion of the media content (programming and/or non-programming). Thereafter, at a certain time point based on the trigger identifier, an advertisement media 808 (or in some cases, a programming media, e.g., a TV show that points to a product placement opportunity) for a product offering 810 is played on the channel (represented by the channel logo 804). The inaudible beacon (i.e., a trigger identifier) present in the audio portion of the advertisement media 808 may be received by the smart speaker 806, via a set of microphones in the smart speaker 806, during playback of the audio portion of the advertisement media 808. Upon receipt of the inaudible beacon, the smart speaker 806 may be configured to execute an online (i.e., transfer the received audio beacon to servers managed by the interactive service provider 110) or an offline (i.e., on-device processing) detection operation on the inaudible beacon during the playback duration of the advertisement media 808 and facilitate a conversation using the virtual voice assistant with the user 802 to receive a trigger response from the user 802.

The virtual conversational agent may start the conversation by describing about the product offering 810 presented on the display 138. Such conversation may inform the user 802 to act within a duration for which the smart speaker 806 is activated. In an event where a voice response is said by the user 802 to purchase the product offering 810 in the conversation, the virtual conversational agent may confirm an order for the product offering 810 and the client device 134 may display a shopping cart 812 where the product offering 810 is added. The client device 134 may further transfer the voice response from the user 802 as a trigger response to the fulfillment server 146. The fulfillment server 146 may receive the trigger response (which may include details of the selected product offering 810 and user details (e.g., payment details, delivery address, etc.)). Upon receipt of the trigger response, the fulfillment server 146 may be configured to complete a transaction and the selected product offering 810 may be ordered for delivery.

In some embodiments, throughout the whole client-side detection and delivery of services, the video service provider 128 may rely on the services of a third party interactive service provider (i.e., the interactive service provider 110) to deliver different services through the client device 134 and may lack actual instruction-based control over interactivity (e.g., overlay graphics, triggers, etc.) on the client device 134. In other embodiments, the video service provider 128 may directly instruct the delivery of different services through the client device 134 and may further have instruction-based control over interactivity on the client device 134. In such case, the interactive service provider 110 may allow the video service provider 128 to access (partial or complete) and/or control (partial or complete) different operations that are associated with the delivery of different services and interactivity on the client device 134.

FIGS. 9A, 9B, 9C, 9D, and 9E are flowcharts that collectively illustrate a method for a third party-controlled delivery of different services through different client devices, in accordance with an embodiment of the disclosure. FIGS. 9A, 9B, 9C, 9D, and 9E are explained in conjunction with elements from FIGS. 1, 2, 3, 4A, 4B, 5A, 5B, 6, 7, and 8. With reference to FIGS. 9A, 9B, 9C, 9D, and 9E, there is shown a flowchart 900. The flowchart may depict a method that starts from 902 and proceeds to 904.

At 904, programming and/or non-programming media content may be transmitted to the interactive service provider 110. The content producer/primary distributor 102 may be configured to transmit the programming and/or non-programming media content to the interactive service provider 110.

At 906, programming and/or non-programming media content may be received from the content producer/primary distributor 102. The interactive service provider 110 may be configured to receive the programming and/or non-programming media content from the content producer/primary distributor 102.

At 908, media analysis may be executed on received programming and/or non-programming media content in response to a request received from the content producer/primary distributor 102. The media analysis system 116 (of the interactive service provider 110) may be configured to execute a media analysis on received programming and/or non-programming media content in response to a received from the content producer/primary distributor 102.

At 910, fingerprint information may be generated for the received programming and/or non-programming media content. The fingerprinting system 120 (of the interactive service provider 110) may be configured to generate fingerprint information for the received programming and/or non-programming media content.

At 912, watermarks may be inserted in the received programming and/or non-programming media content. The watermarking system 122 may be configured to insert the watermarks in the received programming and/or non-programming media content.

At 914, generated fingerprint information and watermark information may be stored in the watermark/fingerprint registry 126. The trigger management system 112 (of the interactive service provider 110) may be configured to store the generated fingerprint information and watermark information in the watermark/fingerprint registry 126.

At 916, programming and/or non-programming media content that is inserted with watermarks is transmitted along with fingerprint information to the content producer/primary distributor 102. The interactive service provider 110 may be configured to transmit the programming and/or non-programming media content that is inserted with watermarks along with fingerprint information to the content producer/primary distributor 102.

At 918, programming and/or non-programming media content that is inserted with watermarks may be received along with fingerprint information from the interactive service provider 110. The content producer/primary distributor 102 may be configured to receive the programming and/or non-programming media content that is inserted with watermarks along with the fingerprint information from the interactive service provider 110.

At 920, programming and/or non-programming media content that is inserted with watermarks along with fingerprint information may be transmitted to the video service provider 128. The content producer/primary distributor 102 may be configured to transmit the received programming and/or non-programming media content that is inserted with watermarks along with fingerprint information to the video service provider 128.

At 922, received programming and/or non-programming media content that is inserted with watermarks along with fingerprint information may be stored in the programming content store 130. The video service provider 128 may be configured to store the received programming and/or non-programming media content that is inserted with watermarks along with fingerprint information in the programming content store 130. ay At 924, media content that includes programming and/or non-programming media content may be prepared. The media encoder/packager 132 may be configured to prepare media content that includes programming media content prepared with received programming and/or non-programming media content (inserted with digital watermarks).

At 926, trigger identifiers in media content may be inserted at event opportunities in the media content. The interactive service provider 110 may be configured to insert trigger identifiers in media content at event opportunities in media content.

At 928, a media stream that includes the media content inserted with the trigger identifiers may be transmitted to the client device 134. The video service provider 128 may be configured to transmit the media stream that includes the prepared media content inserted with the trigger identifiers to the client device 134.

At 930, the event information associated with each trigger identifier may be stored in the trigger registry 206. The interactive service provider 110 may be configured to store the event information associated with each trigger identifier in the trigger registry 206.

At 932, the media stream that includes the media content inserted with the trigger identifiers may be received. The client device 134 may be configured to receive the media stream that includes the prepared media content inserted with the trigger identifiers.

At 934, it may be determined whether a fingerprint detection or a watermark detection is required. The client device 134 may be configured to determine whether a fingerprint detection or a watermark detection is required. In a case where the requirement exists, control passes to 944. Otherwise, control passes to 936. In some embodiments, instead of selecting an optimal detection method, both trigger identifiers, and watermarks/fingerprints may be used. In such implementation, some event opportunities may only be triggered by watermarks and fingerprints from the interactive service provider 110 at the client device 134 and other events may be triggered by the video service provider 128 at the application level on the client device 134.

At 936, inserted trigger identifiers may be detected in the playback duration of the programing media content at the client device 134. The client device 134 may be configured to detect inserted trigger identifiers in the playback duration of the programing media content at the client device 134.

At 938, a request may be transmitted to the trigger registry 206 in the video service provider 128 to determine event information for one or more detected trigger identifiers. The client device 134 may be configured to transmit the request to the trigger registry 206 to determine event information for one or more detected trigger identifiers.

At 940, event information for one or more detected trigger identifiers may be searched in the trigger registry 206. The video service provider 128 may be configured to search on event information for one or more detected trigger identifiers in the trigger registry 206.

At 942, the event information may be communicated to the client device 134 for one or more detected trigger identifiers. The video service provider 128 may be configured to communicate the event information to the client device 134 for one or more detected trigger identifiers.

At 944, a request may be transmitted to determine fingerprint information or watermark information for one or more detections of fingerprints or inserted watermarks. The client device 134 may request the content/watermark recognizer 140 to determine fingerprint information or watermark information for one or more detections of fingerprints or inserted watermarks in the media content.

At 946, the request to determine fingerprint information or watermark information for one or more detections of fingerprints or inserted watermarks may be received. The interactive service provider 110 may be configured to receive the request to determine fingerprint information or watermark information for one or more detections of fingerprints or inserted watermarks in the media content.

At 948, the fingerprint information or the watermark information in watermark/fingerprint registry 126 may be searched in watermark/fingerprint registry 126 for information related to one or more detections of fingerprints or inserted watermarks. The interactive service provider 110 may be configured to search for fingerprint information or watermark information in the watermark/fingerprint registry 126 for one or more detections of fingerprints or inserted watermarks in the media content.

At 950, the fingerprint information or the watermark information may be communicated to the client device 134. The interactive service provider 110 may be configured to communicate the fingerprint information or the watermark information to the client device 134.

At 952, the communicated fingerprint information or the watermark information may be received from the watermark/fingerprint registry 126. The client device 134 may be configured to receive the communicated fingerprint information or the watermark information from the watermark/fingerprint registry 126.

At 954, the communicated event information may be received from the trigger registry 206. The client device 134 may be configured to receive the communicated event information from the trigger registry.

At 956, it may be determined whether it is required to present overlay graphics at event opportunities for which event information is received. The client device 134 may be configured to determine whether it is required to present overlay graphics at event opportunities for which event information is received. In a case where a requirement exists, control passes to 958. Otherwise, control passes to 934.

At 958, a request may be transmitted to the overlay ad server 144 to transmit overlay graphics for received event information on event opportunities. The client device 134 may be configured to transmit the request to the overlay ad server 144 to transmit overlay graphics for received event information on event opportunities.

At 960, the request to transmit overlay graphics for received event information on event opportunities may be received. The overlay ad server 144 may be configured to receive the request to transmit overlay graphics for received event information on event opportunities.

At 962, the overlay graphics may be transmitted along with graphic metadata to the client device 134. The overlay ad server 144 may be configured to transmit the overlay graphics along with graphic metadata to the client device 134.

At 964, the overlay graphics may be rendered as user-selectable options on at least the client device 134 or the secondary device 136 paired with the client device 134, at event opportunities in the programming media content. The client device 134 may be configured to render the overlay graphics as user-selectable options on at least the client device 134 and the secondary device 136 paired with the client device 134, at event opportunities in the programming media content.

At 966, an input device that is in vicinity of the client device 134 or the secondary device 136 may be paired with the client device 134. The client device 134 may be configured to pair an input device that is in vicinity of the client device 134 or the secondary device 136 with the client device 134.

At 968, it may be determined whether it is required to activate the input device or the rendered overlay graphic at event opportunities. The client device 134 may be configured to determine whether it is required to activate the input device or the rendered overlay graphic at event opportunities. In a case where a requirement exists, control passes to 970. Otherwise, control passes to 934.

At 970, the input device may be activated while the overlay graphics are displayed at event opportunities in the playback duration of the programming media content on the client device 134 or the secondary device 136 paired with the client device 134. The client device 134 may be configured to activate the input device while the overlay graphics are displayed at event opportunities in the playback duration of the programming media content on the client device 134 or the secondary device 136 paired with the client device 134.

At 972, one or more trigger responses may be received for one or more event opportunities, via the activated input device or rendered overlay graphics. The client device 134 may be configured to receive the one or more trigger responses for one or more event opportunities, via the activated input device or rendered overlay graphics.

At 974, a request may be transmitted to the fulfillment server 146 to deliver services based on received one or more trigger responses. The client device 134 may be configured to transmit the request to the fulfillment server 146 to deliver services based on received one or more trigger responses.

At 976, the request may be received from the client device 134 for delivery of services based on received one or more trigger responses. The fulfillment server 146 may be configured to receive the request from the client device 134 for delivery of services based on received one or more trigger responses.

At 978, services may be delivered in response to the received one or more trigger responses on event opportunities in the programming media content. The fulfillment server 146 may be configured to deliver services in response to the received one or more trigger responses on event opportunities in the programming media content.

At 980, one or more notifications may be delivered on at least one of the client device 134 or the secondary device 136 paired with the client device 134, in response to the delivery of services or received trigger responses. The fulfillment server 146 may be configured to deliver one or more notifications on at least one of the client device 134 or the secondary device 136 paired with the client device 134, in response to the delivery of services or received trigger responses. Control passes to end.

Figure 10:
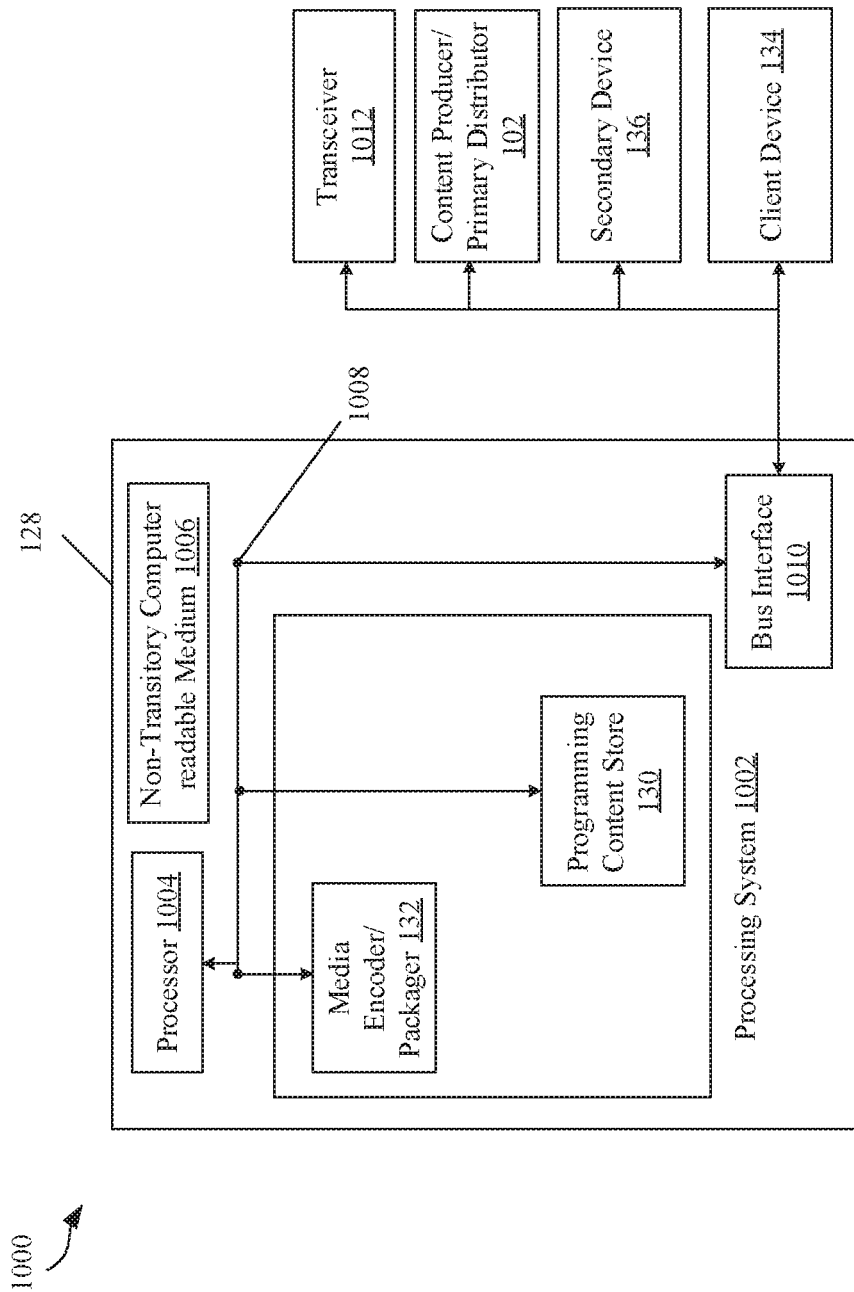
FIG. 10 is a conceptual diagram that illustrates an example of a hardware implementation for a video service provider of FIG. 1 that employs a processing system for delivery of media content for different client devices, in accordance with an exemplary embodiment of the disclosure.

FIG. 10 is a conceptual diagram that illustrates an example of a hardware implementation for a video service provider of FIG. 1 that employs a processing system for delivery of media content for different media content streaming devices, in accordance with an exemplary embodiment of the disclosure. In FIG. 10, the hardware implementation is shown by a representation 1000 for the video service provider 128 that employs a processing system 1002 for management and delivery of services on a distribution network, in response to one or more event triggers, in accordance with an exemplary embodiment of the disclosure, as described herein. In some examples, the processing system 1002 may comprise one or more hardware processors 1004, a non-transitory computer readable medium 1006, the programming content store 130, and the media encoder/packager 132.

In this example, the video service provider 128 that employs the processing system 1002 may be implemented with bus architecture, represented generally by a bus 1008. The bus 1008 may include any number of interconnecting buses and bridges depending on the specific implementation of the video service provider 128 and the overall design constraints. The bus 1008 links together various circuits including the one or more processors, represented generally by the hardware processor 1004, the non-transitory computer-readable media, represented generally by the non-transitory computer readable medium 1006, the programming content store 130, and the media encoder/packager 132 which may be configured to carry out one or more operations or methods described herein. A bus interface 1010 renders an interface between the bus 1008 and a transceiver 1012. The transceiver 1012 facilitates communication via the communication network 148 (FIG. 1) with various other apparatus, such as the client device 134, the secondary device 136, and the content producer/primary distributor 102.

The hardware processor 1004 may be configured to manage the bus 1008 and general processing, including the execution of a set of instructions stored on the non-transitory computer-readable medium 1006. The set of instructions, when executed by the hardware processor 1004, causes the video service provider 128 to execute the various functions described herein for any particular apparatus. The computer-readable medium 1006 may also be used for storing data that is manipulated by the hardware processor 1004 when executing the set of instructions. The non-transitory computer-readable medium 1006 may also be configured to store data for one or more of the programming content store 130, and the media encoder/packager 132.

In an aspect of the disclosure, the hardware processor 1004, the computer-readable medium 1006, or a combination of both may be configured or otherwise specially programmed to execute the operations or functionality of the programming content store 130, the media encoder/packager 132, or various other components described herein. For example, the hardware processor 1004, the non-transitory computer readable medium 1006, or a combination of both may be configured or otherwise specially programmed to perform the operations and functionality of the programming content store 130 and the media encoder/packager 132 as described with respect to FIGS. 1, 2, 3, 4A, 4B, 5A, 5B, 6, 7, 8, and 9A to 9E.

Figure 11:
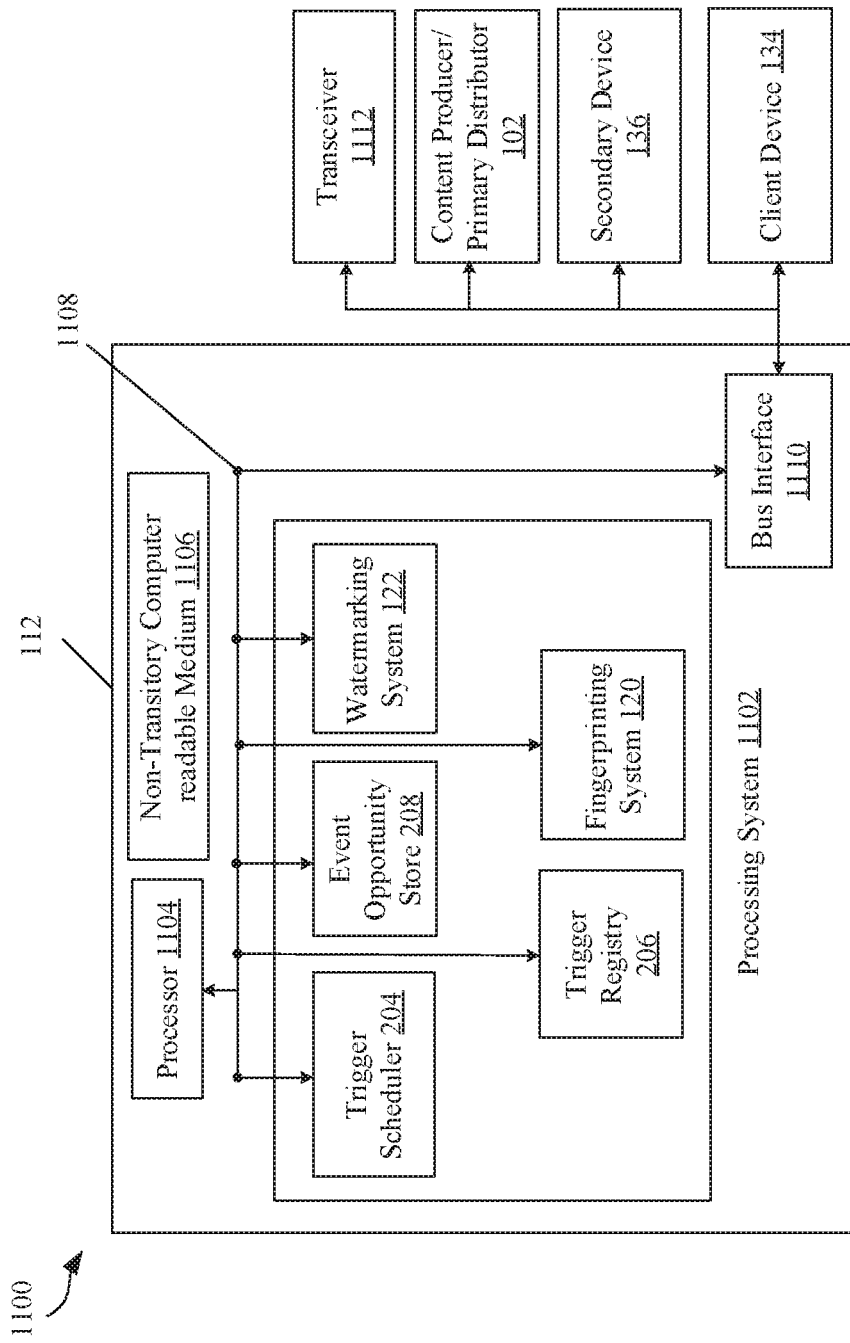
FIG. 11 is a conceptual diagram that illustrates an example of a hardware implementation for the interactive service provider of FIG. 1 that employs a processing system for delivery of different services through different client devices, in accordance with an exemplary embodiment of the disclosure.

FIG. 11 is a conceptual diagram that illustrates an example of a hardware implementation for the interactive service provider of FIG. 1 that employs a processing system for delivery of different services through different client devices, in accordance with an exemplary embodiment of the disclosure. In FIG. 11, the hardware implementation is shown by a representation 1100 for the trigger management system 112 that employs a processing system 1102 for management and delivery of services on a distribution network, in response to one or more event triggers, in accordance with an exemplary embodiment of the disclosure, as described herein. In some examples, the processing system 1102 may comprise one or more hardware processors 1104, a non-transitory computer readable medium 1006, the trigger scheduler 204, the trigger registry 206, the event opportunity store 208, the fingerprinting system 120, and the watermarking system 122.

In this example, the interactive service provider 110 that employs the processing system 1102 may be implemented with bus architecture, represented generally by a bus 1108. The bus 1108 may include any number of interconnecting buses and bridges depending on the specific implementation of the interactive service provider 110 and the overall design constraints. The bus 1108 links together various circuits including the one or more processors, represented generally by the hardware processor 1104, the non-transitory computer-readable media, represented generally by non-transitory the computer readable medium 1106, the trigger scheduler 204, the trigger registry 206, the event opportunity store 208, the fingerprinting system 120, and the watermarking system 122 which may be configured to carry out one or more operations or methods described herein. A bus interface 1110 renders an interface between the bus 1108 and a transceiver 1112. The transceiver 1112 facilitates communication via the communication network 148 (FIG. 1) with various other apparatus, such as the client device 134, the secondary device 136, and the content producer/primary distributor 102.

The hardware processor 1104 may be configured to manage the bus 1108 and general processing, including the execution of a set of instructions stored on the computer-readable medium 1106. The set of instructions, when executed by the hardware processor 1104, causes the interactive service provider 110 to execute the various functions described herein for any particular apparatus. The computer-readable medium 1106 may also be used for storing data that is manipulated by the hardware processor 1104 when executing the set of instructions. The computer-readable medium 1106 may also be configured to store data for one or more of the trigger scheduler 204, the trigger registry 206, the event opportunity store 208, the fingerprinting system 120, and the watermarking system 122.

In an aspect of the disclosure, the hardware processor 1104, the computer-readable medium 1106, or a combination of both may be configured or otherwise specially programmed to execute the operations or functionality of the trigger scheduler 204, the trigger registry 206, the event opportunity store 208, the fingerprinting system 120, the watermarking system 122, or various other components described herein. For example, the hardware processor 1104, the non-transitory computer-readable medium 1106, or a combination of both may be configured or otherwise specially programmed to perform the operations and functionality of the trigger scheduler 204, the trigger registry 206, the event opportunity store 208, the fingerprinting system 120, and the watermarking system 122 as described with respect to FIGS. 1, 2, 3, 4A, 4B, 5A, 5B, 6, 7, 8, 9A to 9E, and 10.

The "OTT services" are services that allows at least one of the video services provider 128, the interactive service provider 110, or the interactive service provider partners 142 to provide audio, video, and other media services (for example, purchase, payment, social sharing, or reverse bidding on products advertised in advertisements) to a consumer over the internet via streaming media, bypassing telecommunications, cable or broadcast television service providers that traditionally act as a controller or distributor of such content. Further, an entity that delivers the OTT service may not own a distribution network through which the OTT service is delivered. In some cases, an entity that delivers the OTT service may partially or completely own a distribution network through which the OTT service is delivered. For example, an entity that delivers the OTT service may deliver the OTT service through a network owned by a different service provider.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences, and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:
1. A system, comprising:
a first processor in an interactive service provider for delivery of at least one service over media content to a client device, wherein the media content is prepared by a video service provider,
wherein the first processor is configured to:

insert at least one of a plurality of digital watermarks or a plurality of digital fingerprints in the media content, wherein the at least one of the plurality of digital watermarks or the plurality of digital fingerprints is received from a pre-produced master content store, wherein the media content comprises programming media content and non-programming media content;

search for at least one of fingerprint information or watermark information in a registry for the at least one of the plurality of digital watermarks or the plurality of digital fingerprints in the media content, based on analysis of at least one of a context, a user preference, or a defined goal of different segments in the programming media content and the non-programming media content, wherein the at least one of the fingerprint information or the watermark information enables the first processor to keep a track of a user engagement with the media content, wherein the video service provider comprises a second processor for delivery of the media content to the client device, wherein the second processor is configured to:

transmit a media stream of the media content to the client device, wherein the at least one of the plurality of digital watermarks or the plurality of digital fingerprints are at a plurality of event opportunities in the media content, wherein the plurality of event opportunities corresponds to a plurality of candidate time intervals in a playback duration of the media content; and wherein the client device comprises a third processor, wherein the third processor is configured to:

detect the at least one of the plurality of digital watermarks or the plurality of digital fingerprints inserted in the playback duration of the media content at the client device;

render a plurality of overlay graphics on the media content for the plurality of candidate time intervals in the media content in the playback duration of the media content based on the at least one of fingerprint information or watermark information;

determine availability of a set of input devices within a distance from the client device or a secondary device paired with the client device;

activate at least one of the plurality of overlay graphics on the media content from a repository of overlay graphics or one or more input devices of the set of input devices in a vicinity of the client device;

render a notification sent to the client device by the interactive service provider, based on a history of the at least one service delivered by the interactive service provider, and wherein at least one of the one or more input devices are paired with at least one of the client device or the secondary device;

receive one or more trigger responses over an activated overlay graphic rendered on the media content in the playback duration of the media content, via the one or more input devices;

display an interactive view on the client device, wherein the interactive view comprises a user-selectable option;

transfer a first state of display associated with the non-programming media content to a second state of display associated with the at least one service based on a selection of the user-selectable option in the interactive view; and enable delivery of the at least one service to perform an action on the non- programming media content based on the one or more trigger responses and the transfer of the first state of display associated with the non-programming media content to the second state of display associated with the at least one service, wherein the delivery of the at least one service is enabled at the client device in communication with a fulfillment server that fulfills the delivery of the at least one service to increase the user engagement to select the at least one service.

2. The system according to claim 1, wherein the first processor is further configured to insert a plurality of trigger identifiers at the plurality of event opportunities in the media content.

3. The system according to claim 2, wherein the third processor is further configured to detect the plurality of trigger identifiers in the playback duration of the media content at the client device.

4. The system according to claim 2, wherein each trigger identifier of the plurality of trigger identifiers is at least one of Society of Cable and Telecom Engineers (SCTE) 35 triggers, SCTE-104 triggers, playlists, manifest tags, Nielsen ID3 tags, inaudible beacons, image beacons, or data beacons.

5. The system according to claim 1, wherein the first processor is further configured to receive a request for analysis of the media content, wherein the analysis comprises at least one digital fingerprint of the media content or digital watermark of the media content.

6. The system according to claim 1, wherein the first processor is further configured to:

fingerprint programming media content and the non-programming media content; and generate fingerprint information for the programming media content and the non- programming media content, wherein the fingerprint information comprises at least one of acoustic fingerprint information or video fingerprint information for different segments of the programming media content and the non-programming media content, wherein the different segments comprises audio frames or image frames of the non-programming media content.

7. The system according to claim 1, wherein the first processor is further configured to insert the plurality of digital watermarks in an audio portion or a video portion of the media content at the plurality of event opportunities in the media content.

8. The system according to claim 7, wherein the first processor is further configured to generate the watermark information that comprises metadata for at least one of an acoustic watermark or a video watermark, wherein the at least one of an acoustic watermark or a video watermark is based on the plurality of digital watermarks inserted between different fragments of the media content.

9. The system according to claim 1, wherein each event opportunity of the plurality of event opportunities corresponds to a specified event in the media content and the specified event corresponds to at least one of start credits, end credits, lull points, time-based marked regions, location-based marked regions, context-based marked regions, explicit scene start and end, or product placement opportunities, within the media content.

10. The system according to claim 1, wherein the third processor is further configured to pair up with at least one input device of the one or more input devices in vicinity of the client device or the secondary device paired with the client device,
wherein the at least one input device is paired via at least one of a Bluetooth network, a Wi-Fi network, an internet-based network, a wired local network, or an wireless ad hoc network.

11. The system according to claim 1, wherein a virtual voice assistant is enabled on at least one input device of the one or more input devices or on the at least one of the client device or the secondary device.

12. The system according to claim 11, wherein the at least one input device enabled with the virtual voice assistant is configured to actively wait and listen for a trigger identifier in an audio portion of the media content.

13. The system according to claim 11, the third processor is further configured to:
instruct the virtual voice assistant to detect at least one beacon within the playback duration of the media content; and
facilitate a conversation with a user associated with the client device, to receive a trigger response of the one or more trigger responses from the user,
wherein the trigger response is received through a user's speech input.

14. The system according to claim 1, wherein the non-programming media content comprises promotional media content for at least one of a product offering or a service offering, and
wherein the promotional media content comprises at least one of graphical content, textual content, video content, or animated content.

15. The system according to claim 1, wherein the at least one service comprises at least one of a direct payment, a direct transaction, or a direct notification for selected at least one product offering or at least one service offering, and a direct update of the selected at least one product offering or the at least one service offering on a shopping cart, a personalized list, or a social platform.

16. The system according to claim 1, wherein the third processor is further configured to execute a check to activate the one or more input devices from the set of input devices or the plurality of overlay graphics on the media content.

17. The system according to claim 16, wherein the activation is based on the check executed on a defined criteria that is associated with records of previous service requests for the plurality of event opportunities on which the at least one service was delivered in past,
wherein the defined criteria comprises at least one of a user-defined constraint, an inventory constraint, a specified threshold count of the one or more trigger responses for a product offering or a service offering promoted by the non-programming media content, and a contextually relevant event opportunity that is identified in the programming media content.

18. The system according to claim 1, the first processor is further configured to instruct a delivery of at least one notification on at least one of the client device or the secondary device paired with the client device,
wherein the delivery of the at least one notification is instructed based on the one or more trigger responses at the client device.

19. The system according to claim 1, wherein the one or more trigger responses corresponds to one or more user interactions that are received based on at least one of a touch input, a gesture input, a haptic input or a voice command input.

20. A method, comprising:
in a first processor of an interactive service provider, a second processor of a video service provider, and a third processor of a client device:
inserting, by the first processor, at least one of a plurality of digital watermarks or a plurality of digital fingerprints in media content,
wherein the at least one of the plurality of digital watermarks or the plurality of digital fingerprints is received from a pre-produced master content store,
wherein the media content comprises programming media content and non-programming media content;
searching for at least one of fingerprint information or watermark information in a registry for the at least one of the plurality of digital watermarks or the plurality of digital fingerprints in the media content, based on analysis of at least one of a context, a user preference, or a defined goal of different segments in the programming media content and the non-programming media content,
wherein the at least one of the fingerprint information or the watermark information enables the first processor to keep a track of a user engagement with the media content,
transmitting, by the second processor, a media stream of the media content to the client device,
wherein the at least one of the plurality of digital watermarks or the plurality of digital fingerprints are at a plurality of event opportunities in the media content,
wherein the plurality of event opportunities corresponds to a plurality of candidate time intervals in a playback duration of the media content;
detecting, by the third processor, the at least one of the plurality of digital watermarks or the plurality of digital fingerprints inserted in the playback duration of the media content at the client device;
rendering, by the third processor, a plurality of overlay graphics on the media content for the plurality of candidate time intervals in the media content in the playback duration of the media content based on the at least one of fingerprint information or watermark information;
determining availability of a set of input devices within a distance from the client device or a secondary device paired with the client device;
activating, by the third processor, at least one of the plurality of overlay graphics on the media content from a repository of overlay graphics or one or more input devices of the set of input devices in vicinity of the client device;
render a notification sent to the client device by the interactive service provider, based on a history of at least one service delivered by the interactive service provider, and
wherein at least one of the one or more input devices are paired with at least one of the client device or the secondary device;
receiving, by the third processor, one or more trigger responses over an activated overlay graphic rendered on the media content in the playback duration of the media content, via the one or more input devices;

displaying, by the third processor, an interactive view on the client device, wherein the interactive view comprises a user-selectable option;

transferring a first state of display associated with the non-programming media content to a second state of display associated with the at least one service based on a selection of the user-selectable option in the interactive view; and enabling delivery of the at least one service to perform an action on the non-programming media content based on the one or more trigger responses and the transfer of the first state of display associated with the non-programming media content to the second state of display associated with the at least one service, wherein the delivery of the at least one service is enabled at the client device in communication with a fulfillment server that fulfills the delivery of the at least one service to increase the user engagement to select the at least one service.

21. The system according to claim 1, wherein the at least one of the plurality of overlay graphics is activated on the media content based on a list of the input devices that are deactivated for an associated media content.

\* \* \* \* \*